(12) United States Patent
Tanaka et al.

(10) Patent No.: US 10,648,052 B2
(45) Date of Patent: May 12, 2020

(54) INDUCTION HARDENING APPARATUS, INDUCTION HARDENING METHOD, INDUCTION HEATING COIL, HEAT TREATMENT APPARATUS, AND HEAT TREATMENT METHOD

(71) Applicant: Neturen Co., Ltd., Shinagawa-ku, Tokyo (JP)

(72) Inventors: Yoshimasa Tanaka, Tokyo (JP); Yoshitaka Misaka, Tokyo (JP); Yuji Asano, Tokyo (JP)

(73) Assignee: Neturen Co., Ltd., Tokyo (JP)

( * ) Notice: Subject to any disclaimer, the term of this patent is extended or adjusted under 35 U.S.C. 154(b) by 513 days.

(21) Appl. No.: 15/354,885

(22) Filed: Nov. 17, 2016

(65) Prior Publication Data

US 2017/0067130 A1    Mar. 9, 2017

Related U.S. Application Data

(60) Division of application No. 13/360,274, filed on Jan. 27, 2012, now Pat. No. 9,534,267, which is a
(Continued)

(30) Foreign Application Priority Data

Jul. 30, 2009  (JP) ................. 2009-178256
May 27, 2010  (JP) ................. 2010-121901
(Continued)

(51) Int. Cl.
*H05B 6/10*  (2006.01)
*C21D 9/40*  (2006.01)
(Continued)

(52) U.S. Cl.
CPC ............... *C21D 9/40* (2013.01); *C21D 1/10* (2013.01); *C21D 1/42* (2013.01); *H05B 6/102* (2013.01);
(Continued)

(58) Field of Classification Search
CPC ... C21D 9/00; C21D 9/08; C21D 9/28; C21D 9/32; C21D 9/40; C21D 1/10; C21D 1/42;
(Continued)

(56) References Cited

U.S. PATENT DOCUMENTS 2,845,377 A  7/1958  Seulen et al.
3,196,244 A  7/1965  Wulf
(Continued)

FOREIGN PATENT DOCUMENTS

CN  1484472 A    3/2004
CN  101008044 A  8/2007
(Continued)

OTHER PUBLICATIONS

Second Chinese Office Action dated Dec. 12, 2016, issued in corresponding Chinese Application No. 201510175153.4, filed Jul. 29, 2010, 20 pages.
(Continued)

*Primary Examiner* — Hung D Nguyen
(74) *Attorney, Agent, or Firm* — Christensen O'Connor Johnson Kindness PLLC

(57) ABSTRACT

According to an embodiment, an induction heating coil includes a heating conductor portion which is formed of a conductor member and has a zigzag shape in which a bent portion opened to one side in a first direction and a bent portion opened to the other side in the first direction are alternately continuously arranged in opposite directions along a second direction crossing the first direction.

10 Claims, 29 Drawing Sheets

Related U.S. Application Data continuation of application No. PCT/JP2010/062847, filed on Jul. 29, 2010.

(30) Foreign Application Priority Data

Jun. 30, 2010 (JP) ................................ 2010-150411
Jul. 12, 2010 (JP) ................................ 2010-157556

(51) Int. Cl.
*C21D 1/42* (2006.01)
*H05B 6/36* (2006.01)
*C21D 1/10* (2006.01)
*H05B 6/40* (2006.01)
*H05B 6/44* (2006.01)
*H05B 6/22* (2006.01)
*H05B 6/30* (2006.01)

(52) U.S. Cl.
CPC ................ *H05B 6/36* (2013.01); *H05B 6/40* (2013.01); *H05B 6/44* (2013.01); *C21D 2221/00* (2013.01); *Y02P 10/253* (2015.11)

(58) Field of Classification Search
CPC ... C21D 1/667; C21D 2221/00; Y02P 10/253; H05B 6/101; H05B 6/102; H05B 6/104; H05B 6/36; H05B 6/365; H05B 6/38; H05B 6/40; H05B 6/44
USPC ....... 219/635, 637, 639, 645, 646, 672, 674, 219/652
See application file for complete search history.

(56) References Cited

U.S. PATENT DOCUMENTS

| | | | |
|---|---|---|---|
| 3,301,991 A * | 1/1967 | Geisel et al. | H05B 6/104 219/637 |
| 3,827,275 A | 8/1974 | Suttan et al. | |
| 3,835,282 A | 9/1974 | Sass et al. | |
| 6,011,246 A | 1/2000 | Bonzano | |
| 6,677,561 B1 * | 1/2004 | Koppinen | C21D 1/42 219/672 |
| 7,146,735 B2 | 12/2006 | Bracht | |
| 2007/0138169 A1 | 6/2007 | Tanaka et al. | |
| 2010/0163551 A1 | 7/2010 | Minoue et al. | |

FOREIGN PATENT DOCUMENTS

| | | | |
|---|---|---|---|
| EP | 1 486 572 A1 | | 12/2004 |
| JP | 53-61509 | | 6/1978 |
| JP | 60-116724 A | | 6/1985 |
| JP | 07-296960 A | | 11/1995 |
| JP | 2000-508109 A | | 6/2000 |
| JP | 2002-174251 A | | 6/2002 |
| JP | 2002-235111 A | * | 8/2002 |
| JP | 2002-235111 A | | 8/2002 |
| JP | 2004-044802 A | | 2/2004 |
| JP | 2004-247193 A | | 9/2004 |
| JP | 2004-353035 A | | 12/2004 |
| JP | 2005-089803 A | | 4/2005 |
| JP | 2005-120415 A | | 5/2005 |
| JP | 2006-179359 A | | 7/2006 |
| JP | 2008-231496 A | | 10/2008 |
| JP | 2008-303402 A | | 12/2008 |
| JP | 2009-287074 A | | 12/2009 |
| JP | 2010-280983 A | | 12/2010 |
| JP | 2011-225998 A | | 11/2011 |
| WO | 2011/010664 A1 | | 1/2011 |

OTHER PUBLICATIONS

Chinese Office Action dated Jun. 24, 2016, issued in corresponding Chinese Application No. 201510175153, filed Jul. 29, 2010, 7 pages.
Chinese Office Action dated Jun. 27, 2016, issued in corresponding Chinese Application No. 201510176797.5, filed Jul. 29, 2010, 16 pages.
Extended European Search Report dated Sep. 7, 2015, issued in corresponding International Application No. PCT/JP2010/062847, filed Jul. 29, 2010, 9 pages.
Fourth Office Action dated Feb. 2, 2016, issued in corresponding Chinese Application No. 201080033937.9, filed Jul. 29, 2010, 20 pages.
International Preliminary Report on Patentability dated Feb. 7, 2012, issued in corresponding International Application No. PCT/JP2010/062847, filed Jul. 29, 2010, 8 pages.
International Search Report dated Nov. 2, 2010, issued in corresponding International Application No. PCT/JP2010/062847, filed Jul. 29, 2010, 3 pages.
Notification for Filing Opinion dated Jul. 11, 2013, issued in corresponding Korean Application No. 2013-7012302, filed May 13, 2013, 8 pages.
Notification of the First Office Action dated Mar. 5, 2014, issued in corresponding Japanese Application No. 201080033937.9, filed Jul. 29, 2010, 13 pages.

* cited by examiner

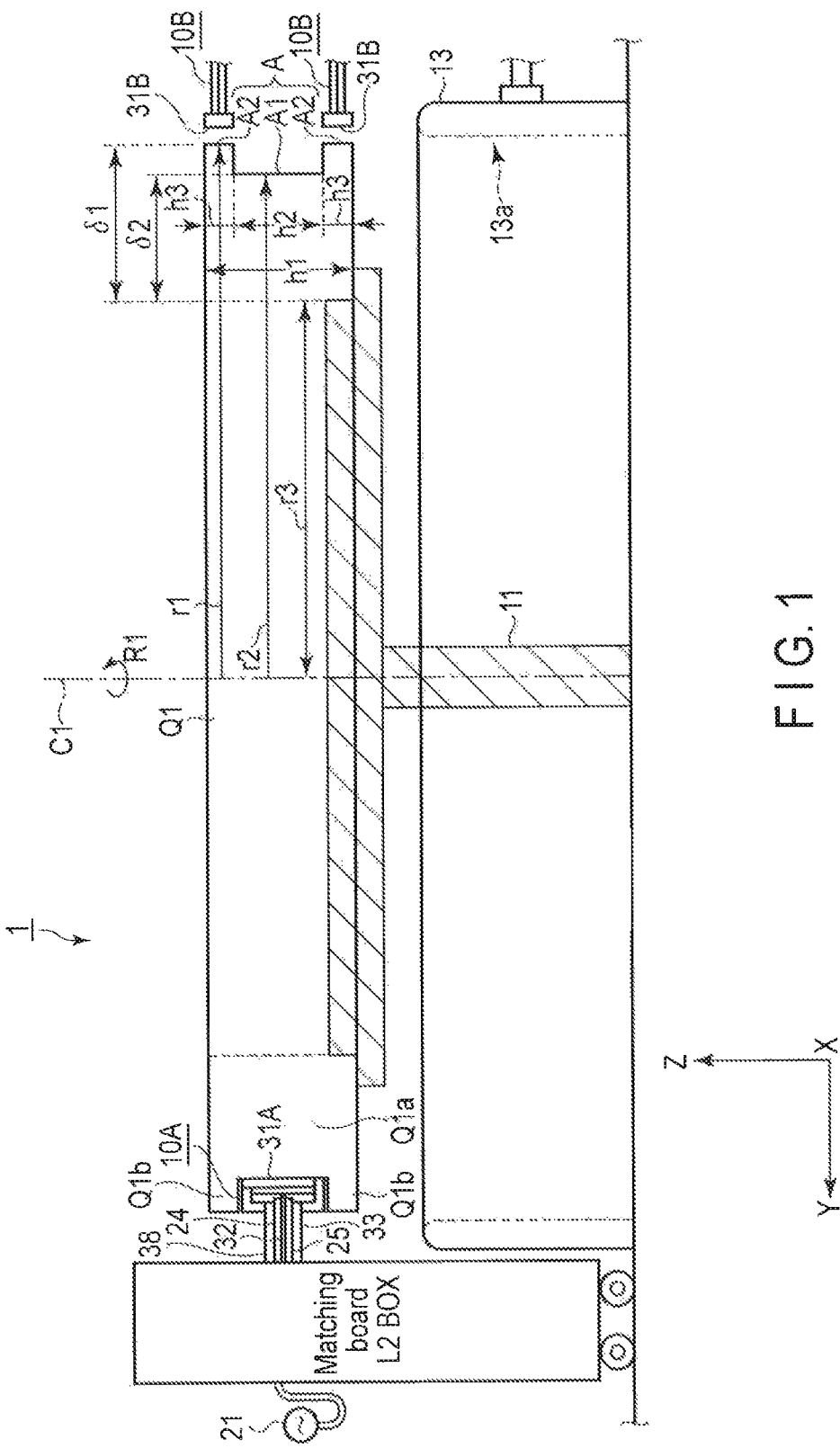
F I G. 1

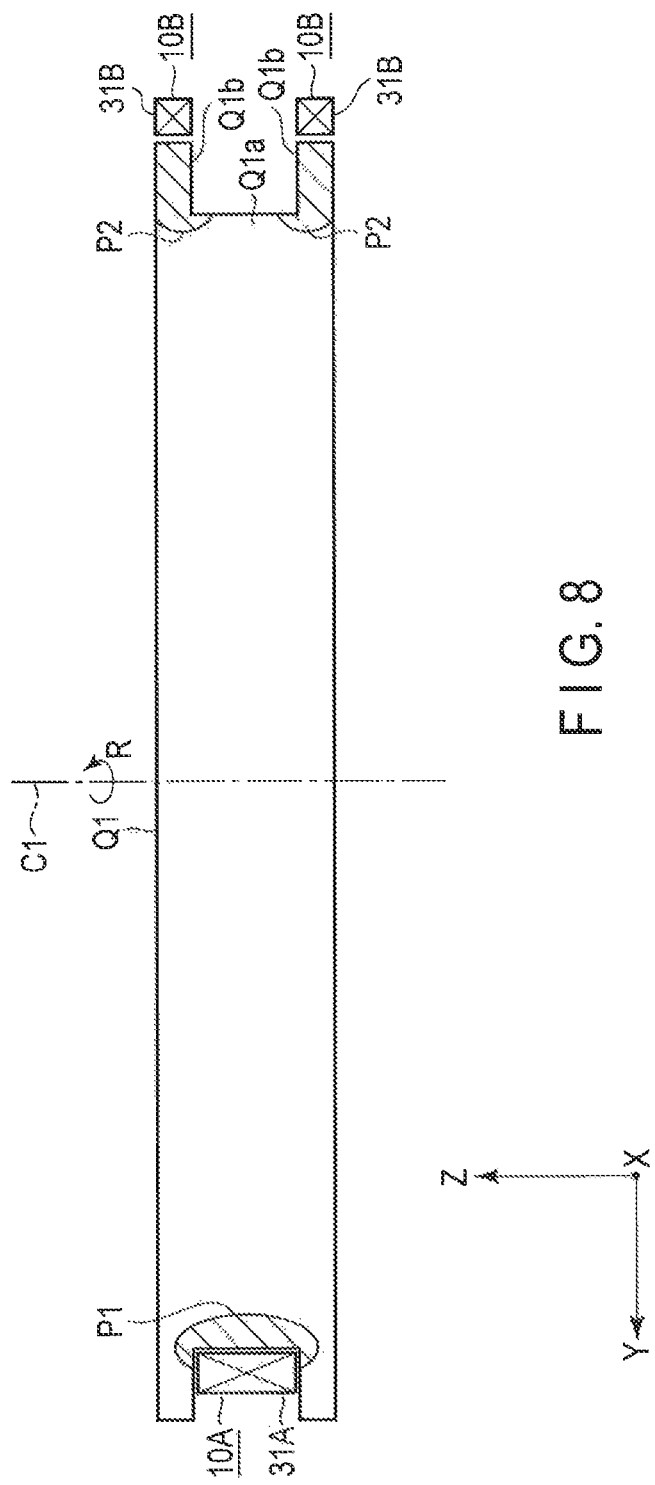
F I G. 8

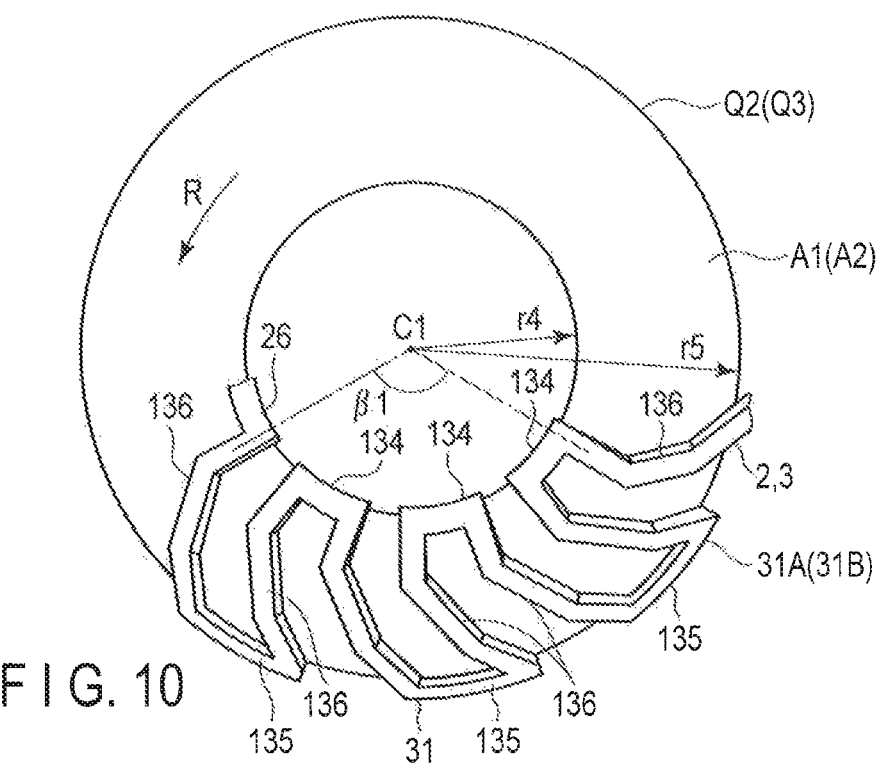
F I G. 10
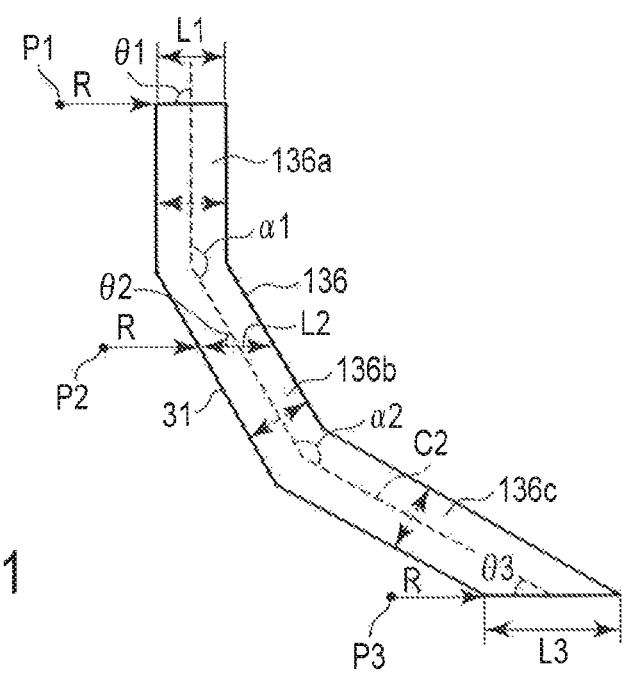
F I G. 11

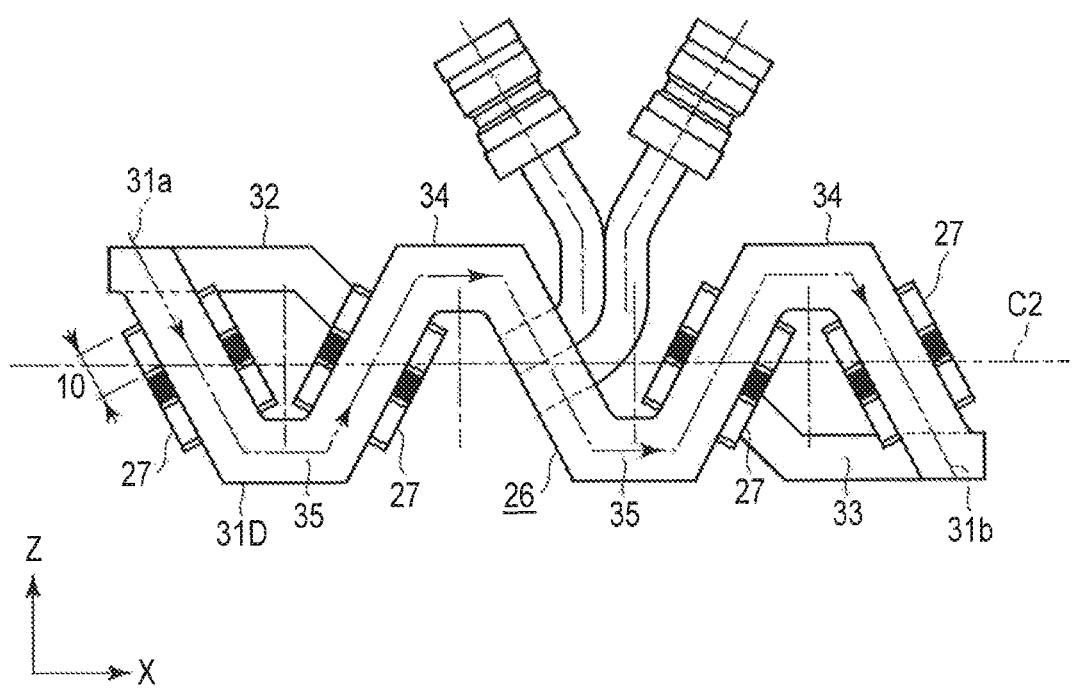
F I G. 16

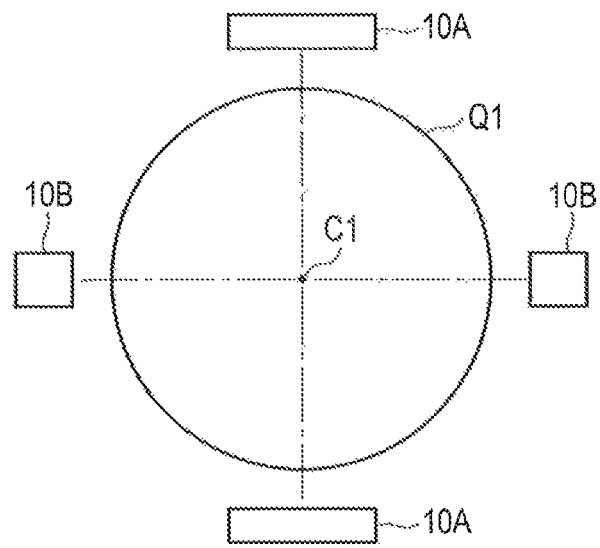
F I G. 17
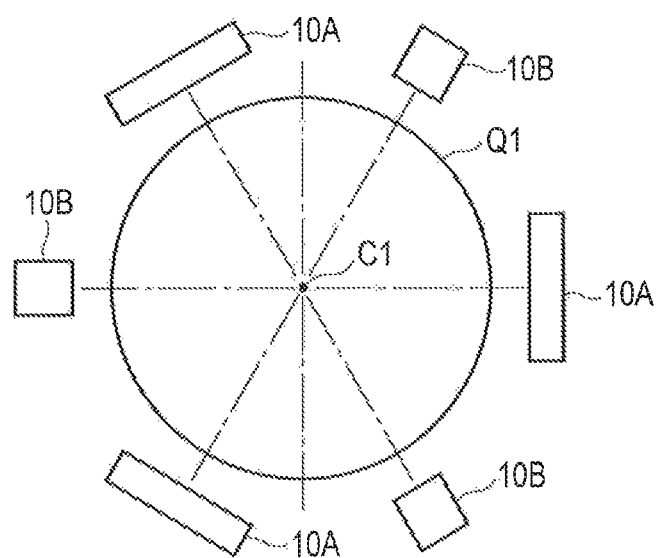
F I G. 18

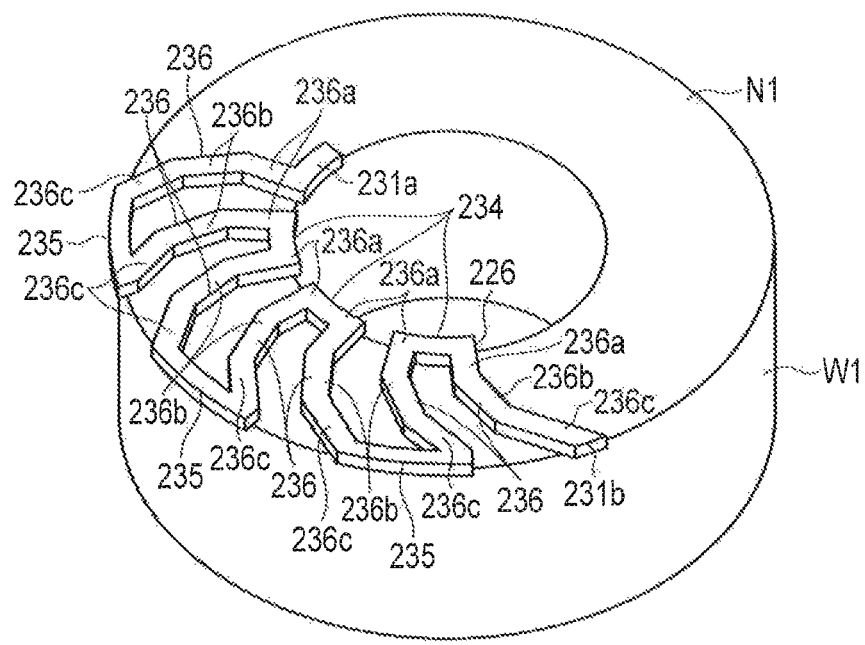
F I G. 24
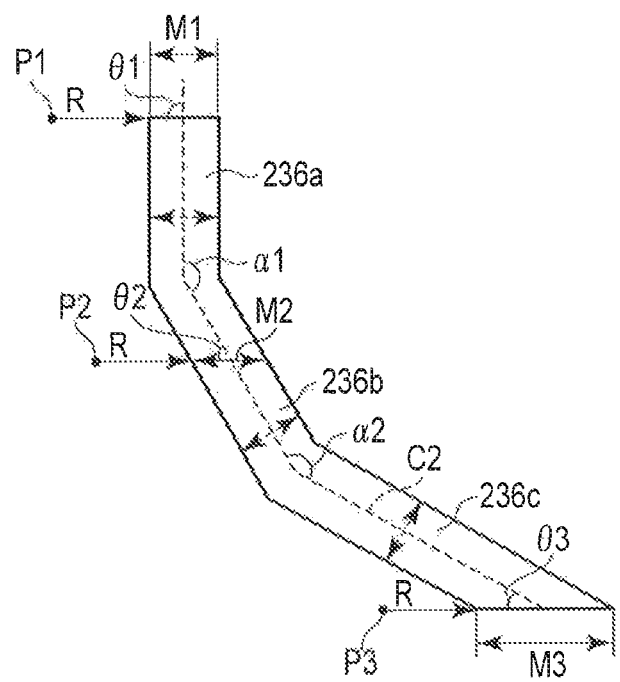
F I G. 25

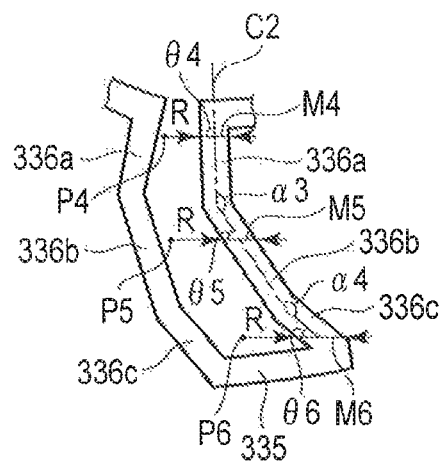
F I G. 30
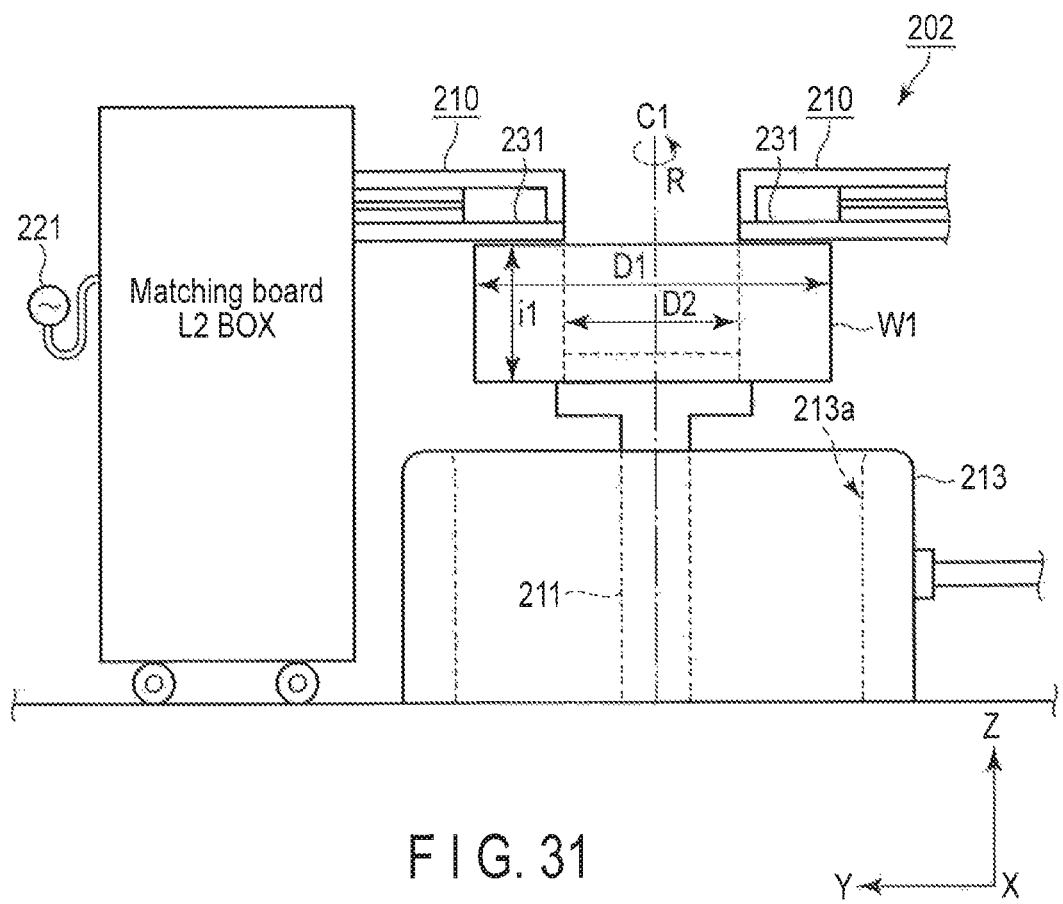
F I G. 31

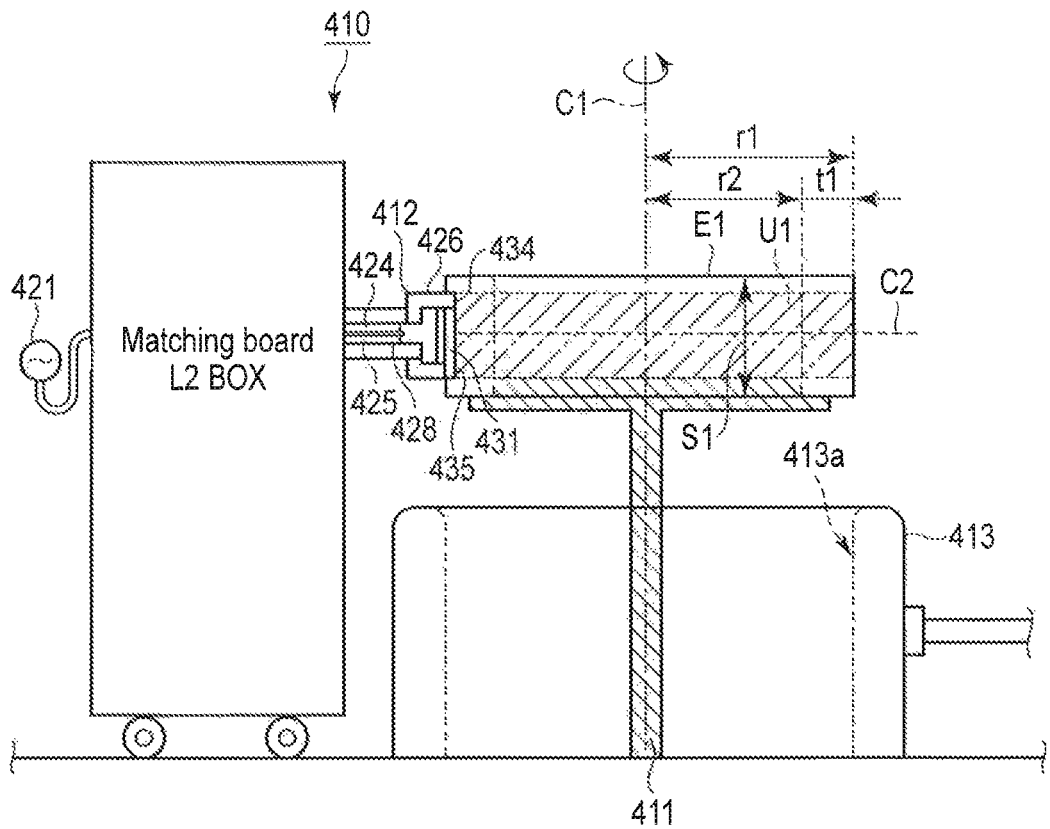
F I G. 34

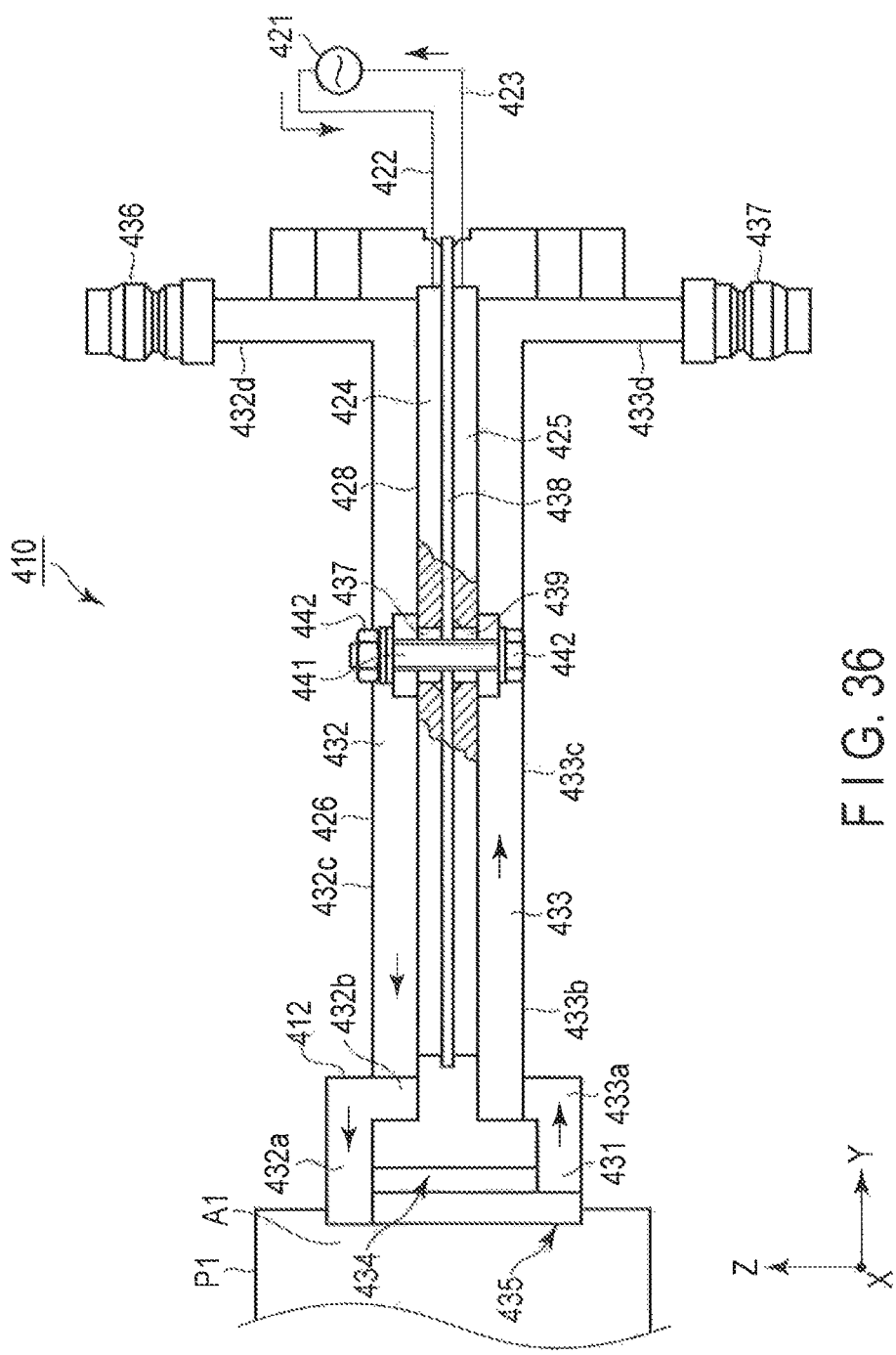
F I G. 36

INDUCTION HARDENING APPARATUS, INDUCTION HARDENING METHOD, INDUCTION HEATING COIL, HEAT TREATMENT APPARATUS, AND HEAT TREATMENT METHOD

CROSS-REFERENCE TO RELATED APPLICATIONS

This application is a divisional of application Ser. No. 13/360,274, filed Jan. 27, 2012, which is a continuation of PCT/JP2010/062847, filed Jul. 29, 2010, which claims priority to Japanese Patent Application Nos. 2009-178256, filed Jul. 30, 2009; 2010-121901, filed May 27, 2010; 2010-150411, filed Jun. 30, 2010; and 2010-157556, filed Jul. 12, 2010, the entire disclosures of which are hereby incorporated by reference herein.

BACKGROUND OF THE INVENTION

1. Field of the Invention

The present invention relates to an induction hardening apparatus, an induction hardening method, an induction heating coil, a heat treatment apparatus, and a heat treatment method, and more particularly to a technology for improving heat treatment efficiency and performing a uniform treatment.

2. Description of the Related Art

In an induction hardening method for performing a heat treatment such as high-frequency hardening with respect to a metal member, there has been known a heat treatment apparatus adopting a single shot heating process for using an induction heating coil facing an entire treatment target region to collectively perform a treatment (e.g., Jpn. Pat. Appln. KOKAI Publication No. 2005-120415, Jpn. Pat. Appln. KOKAI Publication No. 2002-174251, or Jpn. Pat. Appln. KOKAI Publication No. 2004-44802). In such a heat treatment apparatus adopting the single shot heating process, the induction heating coil is formed into a shape associated with the entire treatment target region. For example, an annular induction heating coil is arranged to face a treatment target portion when the treatment target portion has a circular shape, and a tabular induction heating coil is arranged to face a treatment target portion when the treatment target portion has a planar shape. Since such a heating apparatus adopting the single shot heating process uses the induction heating coil to cope with various shapes and sizes of a treatment object and a treatment target portion, a large induction heating coil is required and high-output power is needed when the treatment object and the treatment target portion are large.

On the other hand, there has been known a scanning heat treatment apparatus for sequentially performing a heat treatment and a cooling treatment while relatively moving an induction heating coil, which faces a part of a treatment target portion alone, with respect to the treatment target portion (e.g., Jpn. Pat. Appln. KOKAI Publication No. 2005-89803, or Jpn. Pat. Appln. KOKAI Publication No. Sho 60-116724). In such a scanning heat treatment apparatus, the induction heating coil is formed into a shape associated with a part of the treatment target portion.

The technology of the induction heating has the following problems. That is, in the induction hardening apparatus adopting the single shot heating process, since the induction heating coil associated with a size or a shape of the treatment target portion must be used, for example, when the treatment target portion has a complicated shape, a shape or condition setting of the induction heating coil becomes complicated, and realizing the apparatus is impossible. Furthermore, when the treatment target portion is large, and a big induction heating coil is required, this results in a problem that high-output power is required. Moreover, when the treatment object is deformed due to, e.g., thermal expansion at the time of induction heating, maintaining an appropriate dimension between the induction heating coil and the treatment object is difficult. Therefore, the induction heating coil must be set to have a larger size in advance, and hence a problem of poor heating efficiency occurs.

On the other hand, in the scanning heat treatment method, when the induction heating coil is formed into a shape associated with a part of the treatment target portion, a treatment area per unit time is small, a treatment time is increased, and treatment efficiency is deteriorated. Additionally, in the case of moving the induction heating coil while continuously performing the heat treatment and the cooling treatment, for example, when an annular treatment target portion is to be treated, there occurs a problem of generation of a soft zone, which means the necessary hardness cannot be obtained at a boundary between a start portion and an end portion of the treatment.

Therefore, it is an object of the present invention to provide a technology that can readily realize a heat treatment for a desired region to be heated without requiring high power, a technology that enables a uniform treatment, and a technology that enables improving heat treatment efficiency when performing induction heating on even a large treatment object.

BRIEF SUMMARY OF THE INVENTION

According to one embodiment, an induction hardening apparatus comprises heating coils comprising heating conductor portions that inductively heat different parts of the treatment target portion in an axial direction crossing the circumferential direction, and at least one of the heating coils has a heating conductor portion having a zigzag shape in which a bent portion that is opened to one side in the axial direction and a bent portion opened to the other side in the axial direction are alternately continuously arranged in opposed directions along the circumferential direction wherein a treatment object and a heating coil are relatively moved along a circumferential direction of a treatment target portion of the treatment object based on rotational movement or at least one of the treatment object and the heating coil.

According to another embodiment, an induction hardening method comprises a moving and heating step of arranging heating coils, which have heating conductor portions that inductively heat different parts of a treatment target portion of a treatment object in an axial direction crossing a circumferential direction, to face at least a part of the treatment target portion and relatively moving the treatment target portion and the heating coils along the circumferential direction of the treatment target portion while performing a heat treatment on the treatment target portion using the heating coils, wherein respective regions of the treatment target portion heated by the heating conductor portions of the heating coils form one continuous heating region, and at least one of the heating coils has a zigzag shape in which a bent portion opened to one side in the axial direction and a bent portion opened to the other side in the axial direction are alternately continuously arranged in opposite directions along the circumferential direction.

According to another embodiment, an induction heating coil comprises a heating conductor portion which faces at least a part of a treatment target portion and performs a heat treatment for the treatment target portion while relatively rotationally moving with respect to the treatment target portion, wherein the heating conductor portion comprises a conductor portion that extends to cross the circumferential direction of the rotation and has a configuration such that a length in the circumferential direction of a part apart from the center of the rotational movement is longer than a length in the circumferential direction of a part close to the center.

According to another embodiment, an induction heating coil comprises a heating conductor portion which is formed of a conductor member and has a zigzag shape in which a bent portion opened to one side in a first direction and a bent portion opened to the other side in the first direction are alternately continuously arranged in opposite directions along a second direction crossing the first direction.

BRIEF DESCRIPTION OF THE SEVERAL VIEWS OF THE DRAWING

FIG. 1 is a cross-sectional view taken along a line F2-F2 in FIG. 2 showing an induction hardening apparatus according to a first embodiment of the present invention from a direction of an arrow in FIG. 2;

FIG. 8 is an explanatory view of first and second heating regions according to the first embodiment;

FIG. 10 is an explanatory view showing a configuration of a heating conductor portion in an induction hardening apparatus according to a second embodiment of the present invention;

FIG. 11 is an explanatory view showing a configuration of the heating conductor portion in the induction hardening apparatus;

FIG. 16 is a front view of a heating coil incorporated in an induction hardening apparatus according to a seventh embodiment of the present invention;

FIG. 17 is an explanatory view showing an induction hardening apparatus according to an eighth embodiment of the present invention;

FIG. 18 is an explanatory view showing an induction hardening apparatus according to a ninth embodiment of the present invention;

FIG. 24 is a perspective view showing a heating coil according to the 13th embodiment;

FIG. 25 is an explanatory view of a conductor portion of the heating coil according to the 13th embodiment;

FIG. 30 is an explanatory view showing a configuration of a conductor portion of the heating coil;

FIG. 31 is an explanatory view showing an induction hardening apparatus according to a 15th embodiment of the present invention;

FIG. 34 is an explanatory view showing a heat treatment apparatus according to an 18th embodiment of the present invention;

FIG. 36 is a side view showing the heat treatment apparatus according to the 18th embodiment;

DETAILED DESCRIPTION OF THE INVENTION

Figure 2:
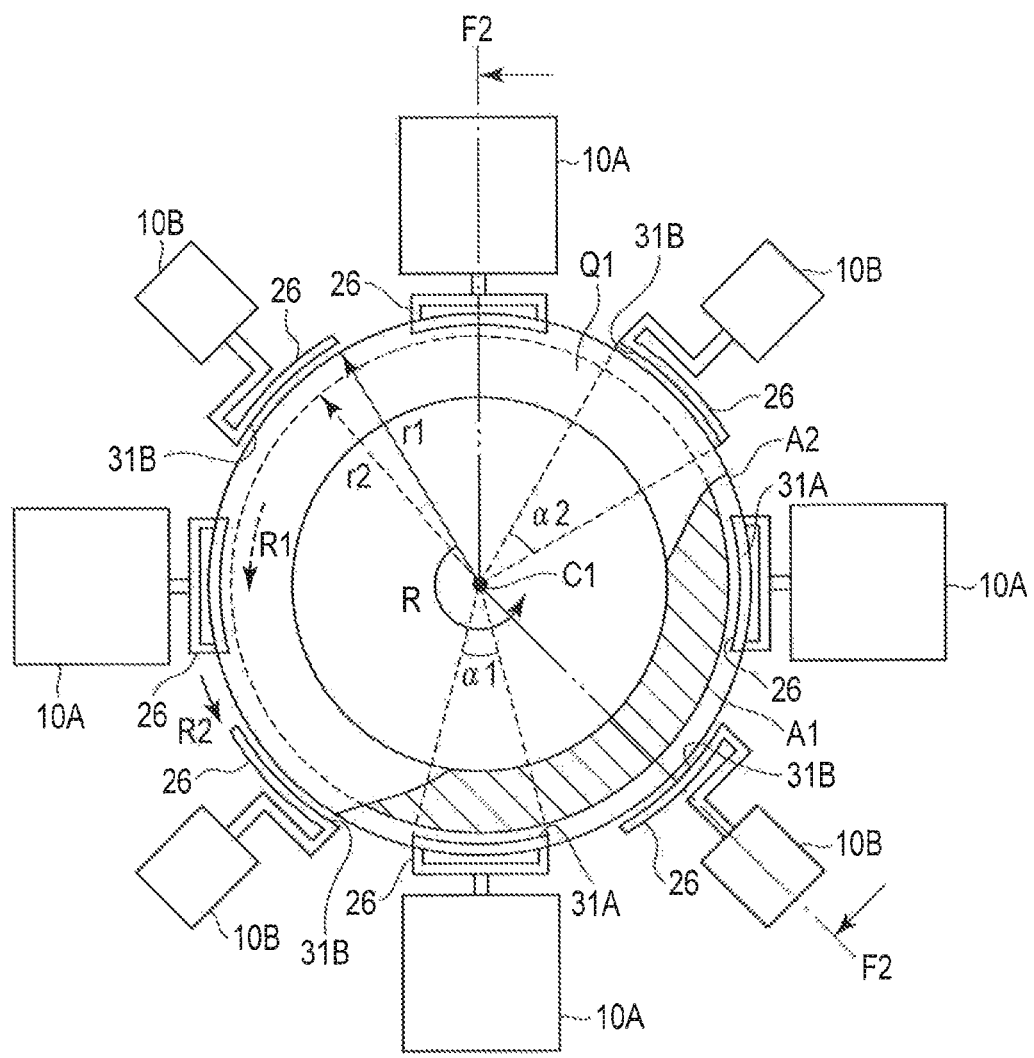
FIG. 2 is a plan view showing the induction hardening apparatus according to the first embodiment.
Figure 3:
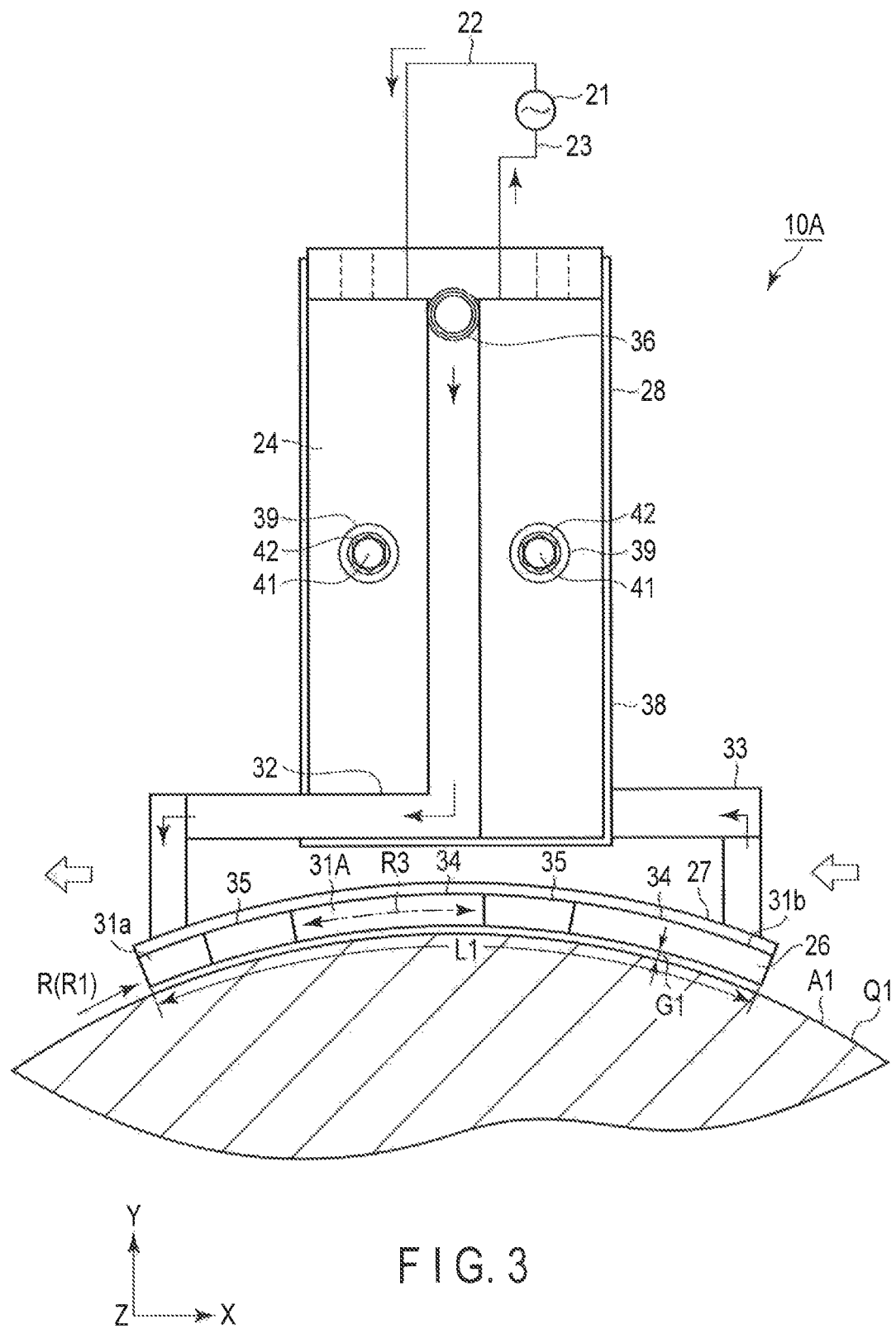
FIG. 3 is a plan view showing a first induction hardening apparatus according to the first embodiment.

Each embodiment according to the present invention will now be described hereinafter. It is to be noted that arrows X, Y, and Z, in the drawings represent three directions that are orthogonal to each other. Furthermore, structures are appropriately scaled up, scaled down, or omitted in each drawing for the purpose of illustration.

First Embodiment

An induction hardening apparatus and an induction hardening method according to a first embodiment of the present invention will now be described hereinafter with reference to FIG. 1 to FIG. 9. FIG. 1 is a cross sectional view showing a configuration of an induction hardening apparatus 1 according to this embodiment, and FIG. 2 is a plan view. As shown in FIG. 1 and FIG. 2, the induction hardening apparatus 1 comprises a movement support unit (moving unit) that movably supports a workpiece Q1 as a treatment object, respective heating devices 10A and 10B arranged on the outer circumference of the workpiece Q1, and cooling unit 13 (cooling unit) that cools the workpiece Q1 after a heating treatment step for the workpiece Q1. The cooling unit 13 provided on the lower side is formed into a cylindrical shape to surround the outer side of the workpiece Q1 that has moved to the lower side after the heating treatment, and it cools the workpiece Q1 arranged in an inner space 13a.

In this embodiment, for example, the cylindrical workpiece Q1 having a step is used, and a stepped outer peripheral surface of this workpiece is determined as a treatment target portion A.

The workpiece Q1 as an example of a treatment object is the stepped cylindrical member having an axis Q1 at the center, a concave portion Q1a that is recessed inward formed at the center in the axial direction, and a convex portion Q1b that protrudes outward formed at both ends in the axial direction. For example, here, there is employed the workpiece Q1 having a convex portion outside radius r1=1800 mm, a concave portion outside radius r2=1780 mm, an inside radius r3=1700 mm, and a length h1 in the axial direction (a first direction)=250 mm. It is to be noted that an outside wall thickness δ1=100 mm and an inside wall thickness δ2=80 mm.

The treatment target portion A that has an endless loop shape and is circularly continuous is heated over the entire circumferential region as a continuous direction of the loop by first heating devices 10A and second heating devices 10B arranged along a predetermined path around the workpiece Q1 while rotating the workpiece Q1 on the axis C1.

In the treatment target portion A, an outer peripheral surface region of the concave portion Q1a at the center in the axial direction is determined as a first region A1, and each of outer peripheral surface regions of the pair of convex portions Q1b at both the ends in the axial direction is determined as a second region A2. The first region A1 and each second region A2 are apart from each other in the axial direction of the treatment object, and they are also apart from each other in the radial direction. The first region A1 is a circular strip-like region having a length h2 in the axial direction=150 mm, and each of the pair of second regions A2 is a circular strip-like region having a length h3 in the axial direction=50 mm.

As shown in FIG. 2, the first heating devices 10A are arranged in the path along the circumferential direction at four positions apart from each other at a center angle of 90 degrees. The second heating devices 10B are arranged in the path along the circumferential direction at four positions apart from each other at the center angle of 90 degrees, and two second heating devices 10B are arranged in parallel along the axial direction to cope with the pair of upper and lower convex portions Q1b at each position.

The first heating devices 10A and the second heating devices 10B are alternately arranged to be apart from each other in the circumferential direction and the axial direction.

A first heating conductor portion 31A of the first heating device 10A is arranged to face the first region A1 while assuring a predetermined gap dimension G1. The first heating device 10A inductively heats the first region A1 in the treatment target portion A on the outer periphery of the workpiece Q1 in an intensive manner. A heating conductor portion 31B of the second heating apparatus 10B is arranged to face the second region A2 while assuring a predetermined gap dimension G2. The second heating device 10B inductively heats the second region A1 in an intensive manner.

In this embodiment, a circumferential direction R along the outer peripheral surface of the workpiece Q1 with the axis C1 at the center is determined as a second direction, and the Z direction as the axial direction of the workpiece Q1 is determined as a first direction. It is to be noted that since the workpiece Q1 has the stepped shape, a radial dimension in the circumferential direction R of the first heating conductor portion is different from that of the second heating conductor portion, but the workpiece Q1 moves along both the circumferential directions when rotated on the axis C1. The paths including the circumferential directions R1 and R2 are defined as moving paths, and a rotational direction including R1 and R2 with C1 at the center is determined as a second direction R. A radius of the circumferential direction R1 is a value obtained by adding the gap dimension G1 to a radial dimension r2 which is an outside diameter dimension of the concave portion Q1a, and it is r2+G1. A radius of the circumferential direction R2 is a value obtained by adding the gap dimension G2 to a radial dimension r1 which is an outside diameter dimension of the convex portion Q1b, and it is r1+G1.

As shown in FIG. 1 to FIG. 4, each of the first heating devices 10A and the second heating devices 10B has a high-frequency power supply 21 as power supplying unit, lead wires 22 and 23 connected to the high-frequency power supply 21, a spacer 28 including a pair of conductive plates 24 and 25 connected to the lead wires 22 and 23, an induction heating coil 26 having both ends connected to the pair of conductive plates 24 and 25, and a core 27 arranged on a back side of the heating conductor portion 31A or 31B of the induction heating coil 26.

The induction heating coil 26 of the heating device 10A continuously and integrally includes the zigzag heating conductor portion 31A facing the first region A1 of the workpiece Q1, a first connection conductor portion 32 continuous with one end side 31a of the heating conductor portion 31A, and a second connection conductor portion 33 continuous with the other end side 31b of the heating conductor portion 31A.

Figure 4:
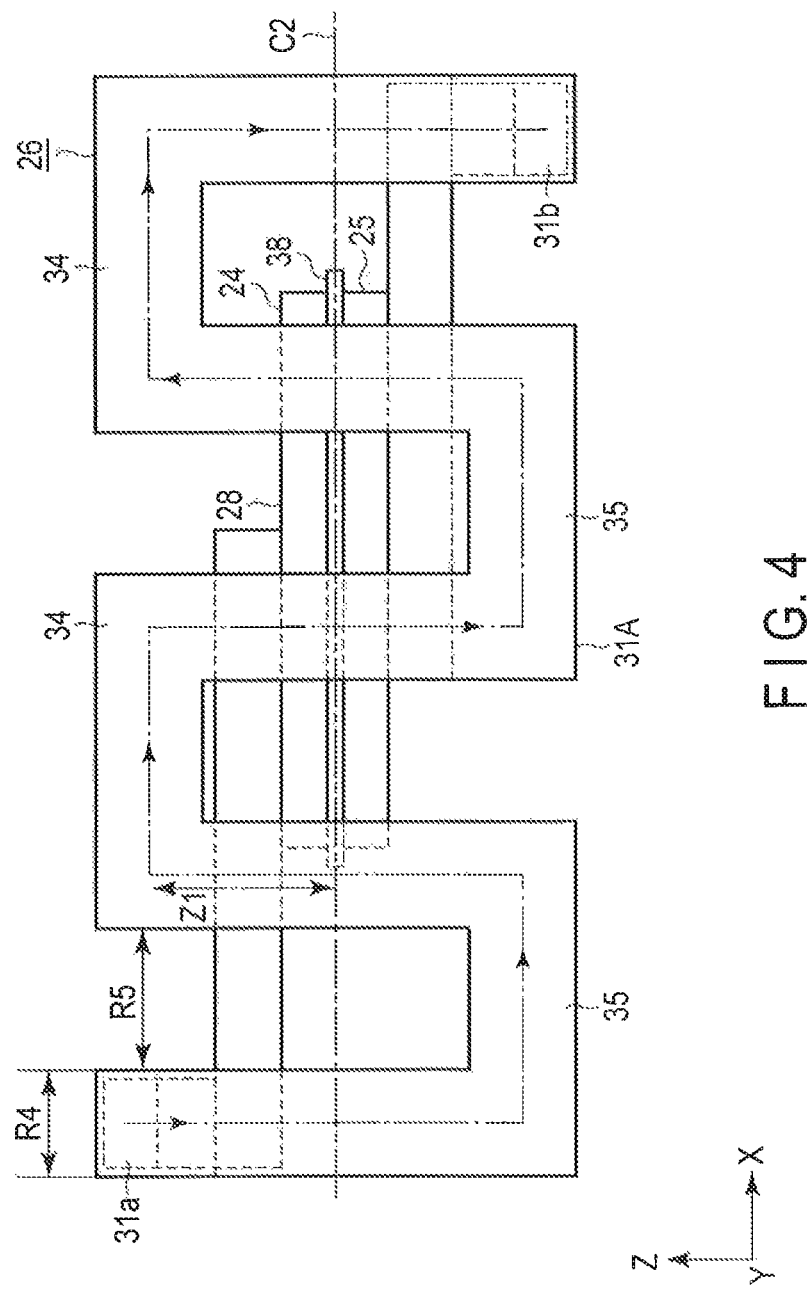
FIG. 4 is a front view showing a first heating coil according to the first embodiment.

As shown in FIG. 4 the heating conductor portion 31A of the first heating device 10A has a zigzag shape such that U-shaped bent portions 34 and 35 are opened toward the center in the Z direction and alternately continuously arranged along the circumferential direction R so that these bent portions face each other. The bent portion 34 has a U-like shape opened toward the lower side, and the bent portion 35 has a like snare shape opened toward the upper side. An interval R5 between the coils adjacent to each the is set to be not less than one times and not greater than two times a dimension of R4 as a coil width. Here, example, a total of the dimensions L1 of the our heating conductor portions 31A in the second direction is set to approximately 1/3 of a dimension of the whole circumference in the second direction of the first region A1. That is, a cover ratio as a ratio of the dimension of the second direction of one heating conductor portion 31A to the first region A1 is set to 1/12, and a central angle α1 is set to 30 degrees.

Figure 5:
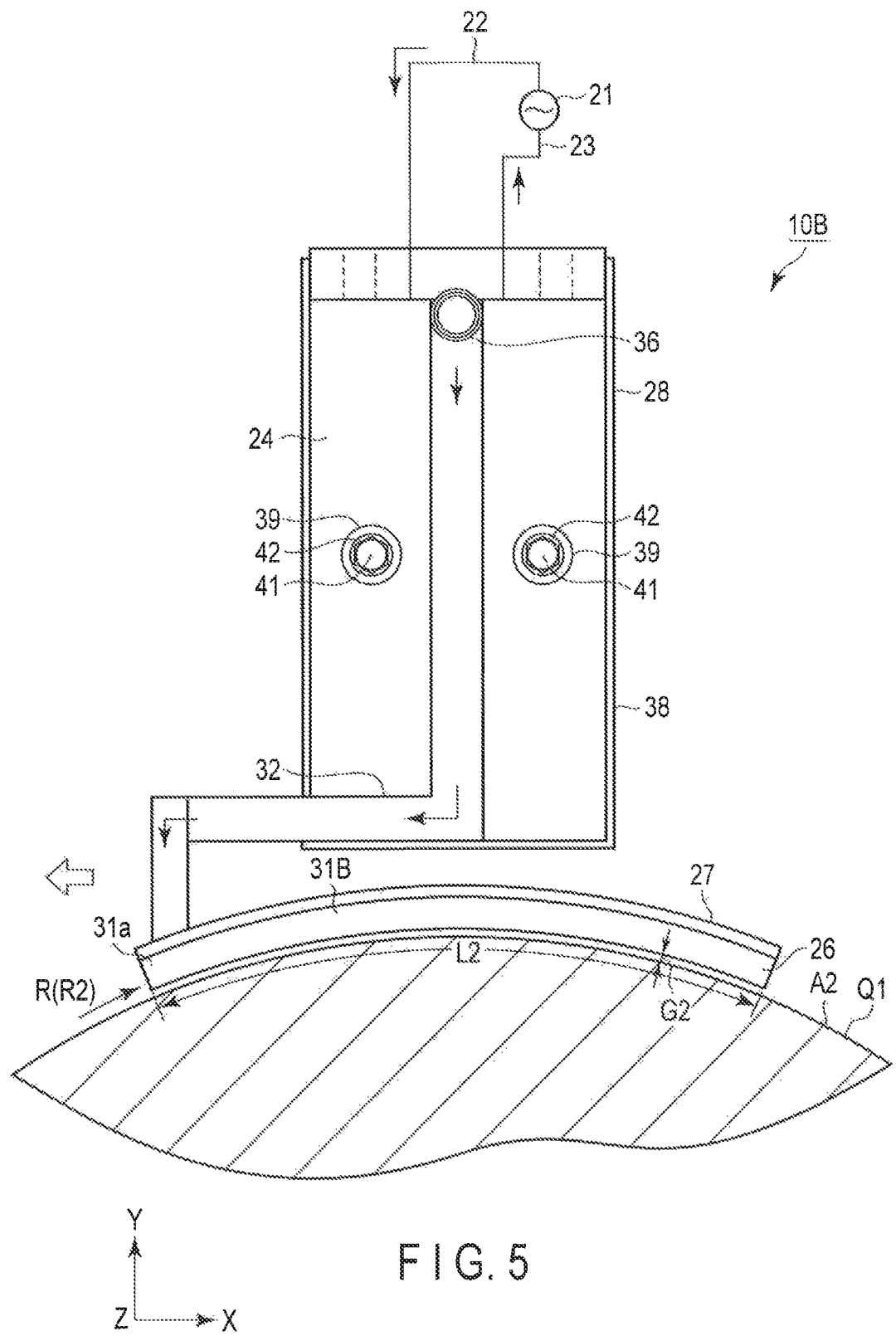
FIG. 5 is a plan view showing a second induction hardening apparatus according to the first embodiment.
Figure 6:
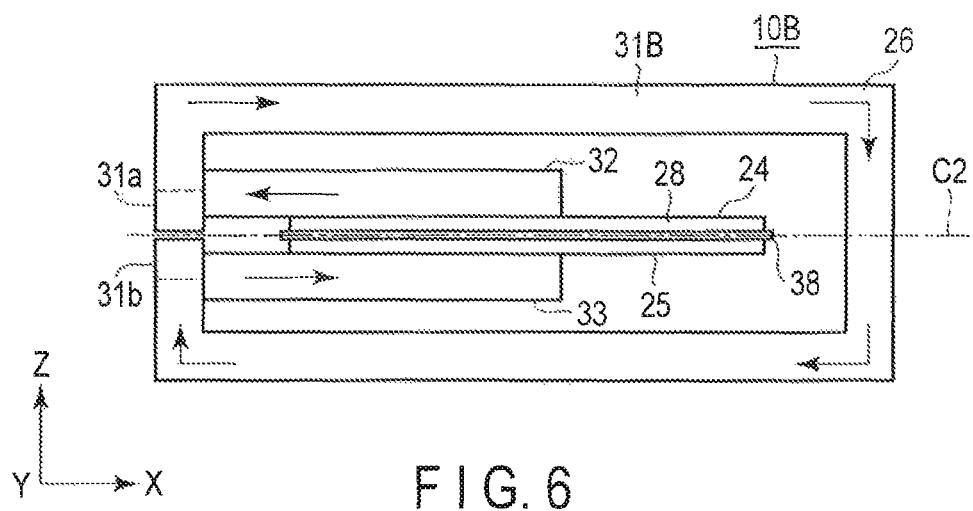
FIG. 6 is a front view showing a second heating coil according to the first embodiment.

As shown in FIG. 5 and FIG. 6, the induction heating coil 26 of the second heating device 10B continuously and integrally includes a hairpin-like heating conductor portion 31B that faces the second region A2 of the workpiece Q1, a first connection conductor portion 32 that is continuous with one end side 31a of the heating conductor portion 31B, and a second connection conductor portion 33 that is continuous with the other end side 31b of the heating conductor portion 31B. When seen from the front side, the heating conductor portion 31B is bent into a rectangular frame shape from the one end side 31a on the left side in FIG. 6, the other end side 31b is configured to return to the lower side of the one end side 31a in the drawing, and the heating conductor portion 31 is continuous with the connection conductor portions 32 and 33 at both the ends 31a and 31b on the left side in the drawing. It is to be noted that a cover ratio of the second heating device 10B is not necessarily set to the same value as that of the first heating device 10A, and it is changed in accordance with a shape of the workpiece.

In each of the heating devices 10A and 10B, the first connection conductor portion 32 and the second connection conductor portion 33 are arranged to sandwich the spacer 28 therebetween. The spacer 28 is constituted by overlapping the pair of conductive plates 24 and 25 each having a rectangular tabular shape and a rectangular tabular insulating plate 38 sandwiched between the pair of conductive plates 24 and 25 and fixing the conductive plates 24 and 25 and the insulating plate 28 through insulating bushes 39 by bolts 41 and nuts 42. The respective conductive plates 24 and 25 are connected to the high-frequency power supply 21 through the lead wires 22 and 23. Couplers 36 and 36 (only one coupler is shown) configured to connect a component such as a hose for a coolant are provided at end portions of the first connection conductor portion 32 and the second connection conductor portion 33.

Figure 7:
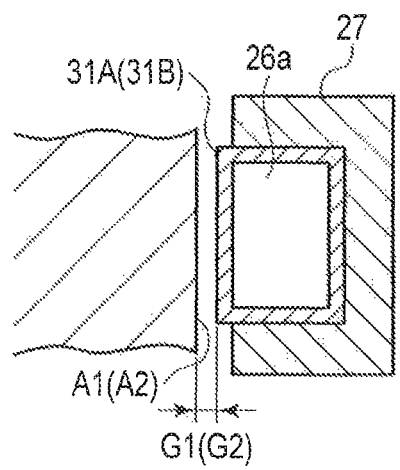
FIG. 7 is an explanatory view showing a cross-sectional configuration of the heating coil according to the first embodiment.

As shown in a cross-sectional view of FIG. 7, the induction heating coil 26 is formed into a rectangular hollow shape from a material such as copper. This hollow portion 26a serves as a path through which the coolant circulates. The core 27 is made of a material having high permeability such as a silicon steel sheet, a polyiron core, or FERROTRON and arranged on the back sides of the heating conductor portions 31A and 31B. The core 27 is formed into a shape having a U-shaped cross section that integrally includes both side portions of each of the heating conductor portions 31A and 31B and a rear wall portion.

A movement support unit 11 depicted in FIG. 1 has a function of rotationally moving the workpiece Q1 on the axis C1 in a state that the workpiece Q1 is set at a predetermined position. At this time, the movement support unit 11 performs control so that the gap dimension G1 between the heating conductor portion 31A and the first region A1 can be maintained at a predetermined value and the gap dimension C2 between the heating conductor portion 31B and the second region A2 can be maintained at a predetermined value.

As descried above, the first heating conductor portion 31A and the second heating conductor portion 31B have shapes different from each other and are apart from each other in the axial direction, and sizes, shapes, and positions of the respective regions A1 and A2 are also different from each other. Therefore, as shown in FIG. 8, a first heating region P1 formed with the central part of the concave portion Q1a in the Z direction at the center and a second heating region P2 formed with the center of each of the pair of upper and lower convex portions Q1b at the center are heating regions different in the axial direction.

An induction hardening method according to this embodiment will now be described. The induction hardening method according to this embodiment is constituted of a moving and heating step of relatively moving the treatment target portion A and the heating conductor portions 31A and 31B while heating the treatment target portion A and a cooling step of cooling the treatment target portion A after the moving and heating step.

At the moving and heating step, the first region A1 as a part of the treatment target portion A is arranged to face the first heating conductor portion 31A, the second region A2 that is at least a part of the treatment target portion A is arranged to face the second heating conductor portion 31B having the second heating region P2 different from the first heating region P1 provided by the first heating conductor portion 31A and the regions A1 and A2 are relatively moved with respect to the first heating conductor portion 31A and the second heating conductor portion 31B along the predetermined second direction R while heating the treatment target portion A by the first heating conductor portion 31A and the second heating conductor portion 31B.

Specifically, when the high-frequency power supply 21 is turned on in a state that the heating conductor portions 31A and 31B face the first and second regions A1 and A2, a high-frequency current flows through the lead wire 22, the first conductive plate 24, the first connection conductor portion 32, the heating conductor portion 31, the second connection conductor portion 33, the second conductive plate 25, and the lead wire 23 in the mentioned order and returns to the high-frequency power supply 21. At this time, in the heating conductor portions 31A and 31B, the high-frequency current flows from the one end is side toward the other end 31b side, and an induction current is generated on surfaces of the heating conductor portions 31A and 31B to inductively heat the oppositely arranged regions A1 and A2. Then, the heating is carried out simultaneously at positions apart from each other by a fixed distance in the axial direction and the radial direction. That is, the opposed surface of the workpiece Q1 is subjected to a heating treatment at the respective positions apart from each other.

When the workpiece Q1 is rotated on the axis C1 in a state that each of the gap dimensions G1 and G2 is maintained at a predetermined value by the movement support unit 11 while performing this heating treatment, the treatment target portion A is relatively moved with respect to the heating conductor portions 31A and 31B along the second direction R at a predetermined speed. For example, here, the relative movement is effected at a speed of 200 to 300 mm/sec while maintaining a power of 100 to 150 kW and the gap dimension G1 or G2=2.5 mm.

Figure 9:
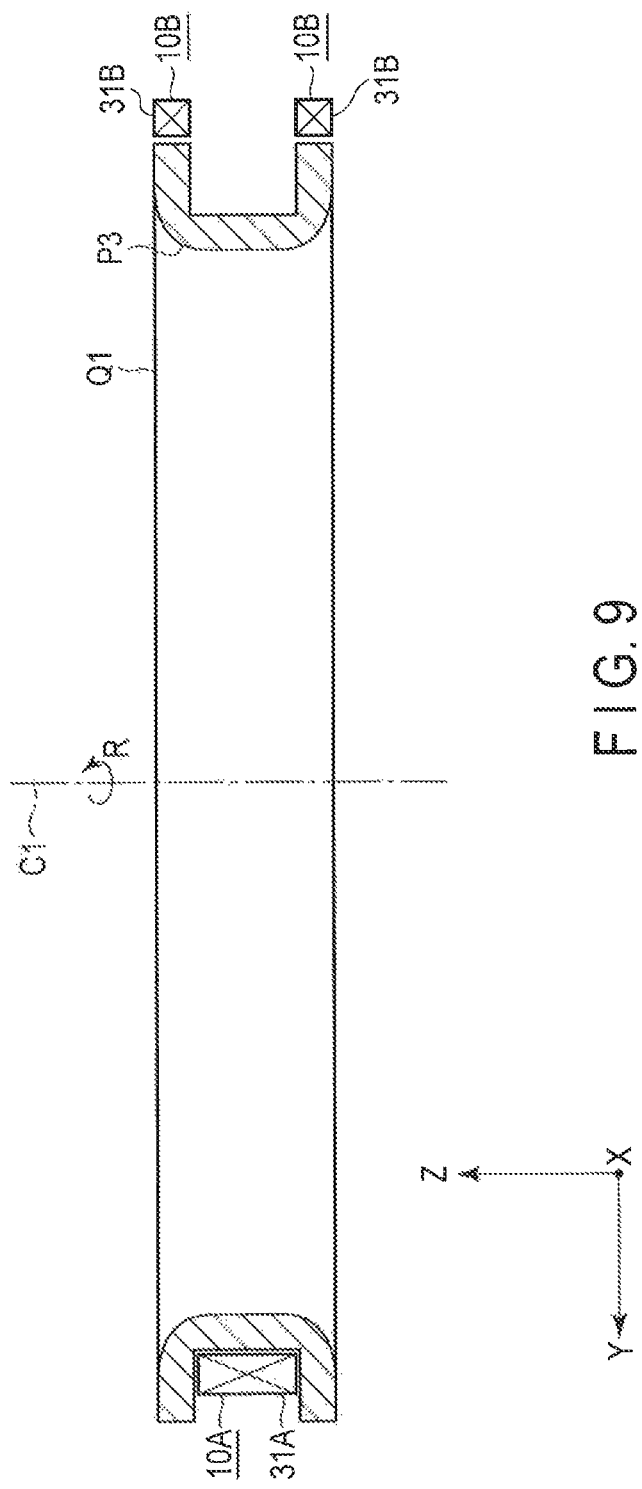
FIG. 9 is an explanatory view of a third heating region according to the first embodiment.

Based on this moving and heating step, a first heat treatment using the first heating conductor portion and second heating using the second heating conductor portion are sequentially carried out in each region of the treatment target portion A. Here, when the workpiece Q1 is rotated 90 degrees, the first and second heating processes are carried out with respect to the whole circumference of the treatment target portion A. The respective heating regions P1 and P2 of the treatment target portion A heated by the heating conductor portions 31A and 31B form one continuous heating region P3. Therefore, as shown in FIG. 8 and FIG. 9, the first and second heating regions P1 and P2 are combined, and the heat treatment is performed in the desired third heating region 23.

Then, after the moving and heating step for the entire stroke in the second direction of the treatment target portion, the movement support unit 11 moves the workpiece Q1 to the lower cooling unit 13 along the axial direction. The cooling unit 13 uses the coolant to cool the workpiece Q1 arranged in the space 13a that is a cooling region surrounded by a cooling jacket (a cooling step).

According to the induction heating coil, the induction hardening apparatus, and the induction hardening method of this embodiment, the following effects can be obtained.

According to the embodiment, when the heating conductor portions 31A and 31B are combined to perform the heat treatment, the heating regions provided at different positions can be combined to obtain one continuous heating region, and hence the heat treatment for the desired heating region can be realized with the simple configuration. When the treatment target portion has a complicated shape, the uniform desired heat treatment can be likewise realized with the simple configuration.

Further, since the first heating conductor portion 31A that heats the first region A1 which is a region large in the axial direction is formed into the zigzag shape continuously having bent portions, a ferromagnetic field can be assured, and a good temperature pattern can be obtained. Therefore, the high-speed uniform heat treatment can be performed with a small amount of power. When the heating conductor portion 31 having the zigzag shape according to this embodiment is used, the heat treatment can be realized with a speed of 200 to 300 mm/sec and a heating time=300 s in a case of achieving an end-point temperature of 850 degrees on the surface of the first region A1 with the power of 100 kW. That is, when the induction heating coil 26 having the zigzag heating conductor portion 31 is used, for example, it is possible to realize the heat treatment for a large workpiece based on scanning partial heating that cannot be realized by the hairpin-like induction heating coil associated with the first region A1. For example, although the coil efficiency is 30 to 40% in planar (end face) heating using the hairpin-like induction heating coil, the coil efficiency exceeds 70% in the zigzag induction heating coil.

Further, using such a high-efficiency heating coil enables the uniform heat treatment having no soft zone at a start end and a termination end of the treatment when the treatment target portion A has a loop-like shape. Therefore, for example, if a roller bearing is a workpiece and a raceway surface on which a rolling element passes is the treatment target portion A, a uniform hardened layer with no soft zone can be formed, thereby obtaining particularly excellent characteristics.

Since the heating treatment is carried out while arranging the heating devices to face a part of the treatment target portion A alone and effecting the relative movement, a size of the heating conductor portion 31 can be decreased even though the treatment target portion A and the workpiece Q1 are large, and the respective heating devices 10A and 10B can be reduced in size. Therefore, the necessary power can be reduced, and a manufacturing cost can be decreased.

Further, since the heating treatment is carried out while arranging the heating devices to face a part of the treatment target portion A alone and effecting the relative movement, for example, when a circular member having a bent portion is a workpiece, appropriate gap dimensions can be easily maintained even though the workpiece is deformed due to a factor such as thermal expansion. For example, in the case of using an annular induction heating coil associated with a circular treatment target portion to perform the heat treatment adopting a single shot heating process, since the workpiece is deformed due to the thermal expansion, the induction heating coil must be set to be larger in advance, and hence a problem of poor heating efficiency occurs, but appropriate gaps can be maintained by just adjusting the arrangement with respect to the workpiece when a cover ratio is small, as in this embodiment.

Second Embodiment

An induction hardening apparatus 2 according to a second embodiment of the present invention will now be described with reference to FIG. 10 and FIG. 11. It is to be noted that elements other than shapes of a workpiece Q2 and a heating conductor portion 31 are equal to those in the first embodiment to omit a repeated explanation. It is to be noted that the workpiece Q2 has a cylindrical shape having an annular plane portion.

FIG. 10 is a plan view showing an arrangement of the induction hardening apparatus 2 according to this embodiment, and FIG. 11 is en explanatory view showing a shape of the heating conductor portion 31 in the induction hardening apparatus 2.

In this embodiment, as shown in FIG. 10, each of upper and lower end surfaces of the workpiece Q2 has a planar cylindrical shape, and each end surface is determined as a treatment target portion A. Further, the heating conductor portion 31 of a first heating device 10A is formed into a zigzag shape such that bent portions 134 and 135 are alternately, continuously, and oppositely arranged along a circumferential direction R and each bent conductor portion 136 is arranged between the bent portions 134 and 135 facing each other. Each of the bent portions 134 is formed into a bent shape opened toward the outer site which is one side in a direction crossing a moving direction, and each bent portion 135 is formed into a bent shape opened toward the inner side in the radial direction which is the other side of the same.

As shown in FIG. 10 and FIG. 11, each of the conductor portions 136 is extended to cross the circumferential direction R, configured in such a manner that a circumferential length of a part apart from an axis C1 which is the center of rotation is longer than a circumferential length of a part close to the same, and formed in such a manner that a length in the circumferential direction can be associated with a speed in the circumferential direction. Since the conductor portion 136 is bent in such a manner that an extension angle of the hart apart from the axis C1 with respect to the circumferential direction R is smaller than an extension angle of the part close to the axis C1 while maintaining a cross-sectional area and a cross-sectional share orthogonal to an extending direction constant, the speed and the length in the circumferential direction can be associated with each other.

In this embodiment, each of the conductor portions 136 is sectioned into three parts in the radial direction, and a center line C2 of the conductor portion 136 is bent at an angle of α1=α2=150 degrees at respective boundaries between the parts adjacent to each other. This center line is parallel to the extending direction of each part. A first part 136a on the inner side in the radial direction forms an angle of θ1=90 degrees with respect to the circumferential direction R, an intermediate second part 136b is inclined to form an angle of θ2=60 degrees with respect to the circumferential direction R, and the outermost third part 136c is inclined to form an angle or θ3=30 degrees with respect to the circumferential direction R. That is, θ1>θ2>θ3 is achieved.

For example, here, dimensions are set based on two positions, i.e., the innermost point P1 and the outermost point P3 of the workpiece. Assuming that r4 is a radius of rotation (a distance from the center of axis C1) of the reference point P1 on the treatment target portion A1 facing the first part 136a, r5 is a radius of rotation (a distance from the center of axis C1) of the reference point 23 on the treatment target portion A1 facing the third part 136c, L1 is a circumferential dimension of the first part 136a facing P1, and L3 is a circumferential dimension of the third part 136c facing P3, the conductor portion 136 is set to L1:L3≈r4:r5, and the distance from the axis C1 as the center of rotation is associated with the circumferential dimension. In this case, based on P1 and P3, the circumferential dimension (the distance) is inversely proportionate to a circumferential speed which is proportional to the radius of rotation, and a time required for passage, i.e., a heating time is maintained constant. Further, a dimension L1 of the middle second part 136b is set to achieve L1<L2<L3 so that L2 becomes a dimension between L1 and L3.

This embodiment can obtain the same effect as that of the first embodiment. Moreover, the induction hardening apparatus 2 according to this embodiment is set so that a dimension of the heating conductor portion 31 in the moving direction becomes large on the outer peripheral side where a speed of the workpiece Q2 cutting across and passing the heating conductor portion 31 when the workpiece Q2 is rotated on the axis C1 is increased rather than on the inner side where this speed is reduced, and hence a time required for passage can be made uniform, and a heat treatment time is also made uniform.

Third Embodiment

An induction hardening apparatus 2 according to a third embodiment of the present invention will now be described with reference to FIG. 12. It is to be noted that structures are equal to those in the foregoing embodiments except that a shape of a workpiece Q3 is different and a heating conductor portion 31 is parallel to an inclined surface of the workpiece Q3, thereby omitting a repeated explanation.

Since a plan view of the induction hardening apparatus 2 is equal to FIG. 10 and a plan view of the heating conductor portion 31 is equal to FIG. 11, these views will be omitted.

Figure 12:
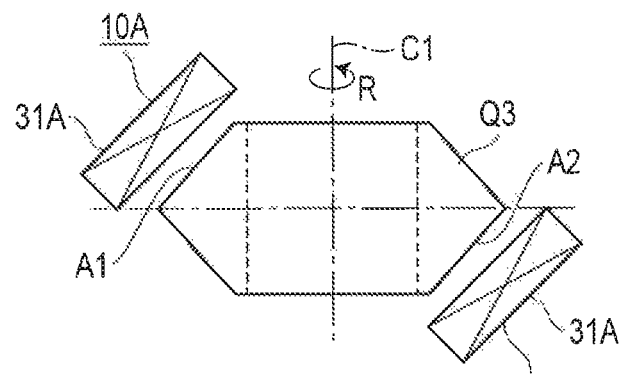
FIG. 12 is an explanatory view showing an induction hardening apparatus according to a third embodiment of the present invention.

In this embodiment, as shown in FIG. 12, the workpiece Q3 has a drum-like shape such that upper and lower outer peripheral surfaces are inclined, and the outer peripheral surfaces are determined as a treatment target portion A. The inclined upper outer peripheral surface of the workpiece Q3 is determined as a first region A1, and the inclined lower outer peripheral surface is determined as a second region A2. An induction hardening apparatus 3 according to this embodiment comprises a first heating device 10A that inductively heats the first region A1 on the upper surface and a second heating device 10A that inductively heats the second region A2 on the lower surface.

Respective heating conductor portions 31A according to this embodiment are inclined with respect to the axial direction and the circumferential direction, and they are configured along the upper and lower outer peripheral surfaces of the workpiece Q3.

As shown in FIG. 10, a heating conductor portion 31A of the first heating device 10A has a zigzag shape in which bent portions 134 and 135 are alternately continuously arranged in opposed directions along the circumferential direction R and each bent conductor portion 136 is arranged between the bent portions 134 and 135 facing each other. Each of the bent portions 134 forms a bent shape opened toward the outer side which is one side of a direction crossing the moving direction, and the bent portion 136 forms a bent shape opened toward the radially inner side which is the other side of the same. Each of the conductor portions 136 is constituted in such a manner that a circumferential length of a portion apart from the axis C1 which is the center of rotation becomes longer a circumferential length of a portion close to the axis C1, and it is formed in such a manner that the length in the circumferential direction is associated with a speed in the circumferential direction. Since the conductor portion 136 is bent in such a manner that an extension angle of the part apart from the axis C1 with respect the circumferential direction R is smaller than an extension angle of the part close to the axis C1 while maintaining a cross-sectional area and a cross sectional shape orthogonal to en extending direction constant, the speed and the length in the circumferential direction can be associated with each other.

This embodiment can obtain the same effect as the first embodiment.

Fourth Embodiment

Figure 13:
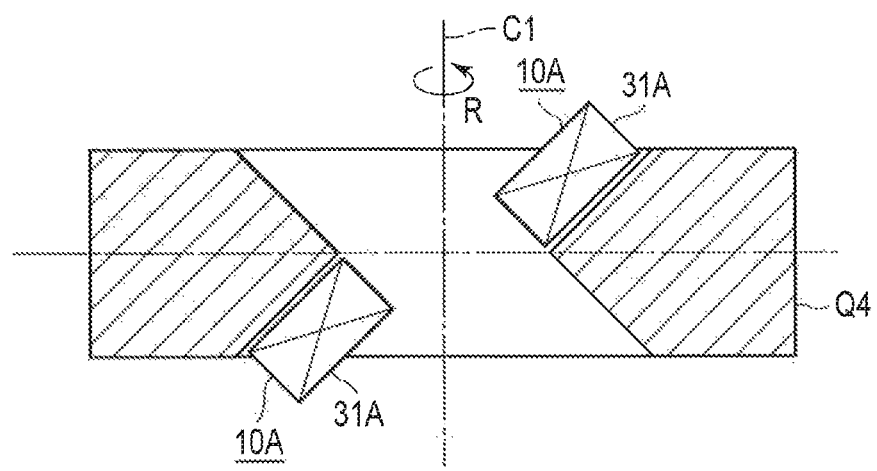
FIG. 13 is en explanatory view showing a primary part of an induction hardening apparatus according to a fourth embodiment of the present invention.

An induction hardening apparatus 3 according to a fourth embodiment of the present invention will now be described hereinafter with reference to FIG. 13. FIG. 13 is an explanatory view showing an arrangement of an induction hardening apparatus according to this embodiment. It is to be noted that structures other than a shape of a workpiece Q4 are equal to those in the second embodiment, thereby omitting a repeated explanation. The workpiece Q4 has a hollow shape and inner peripheral surfaces inclined with respect to the axial direction and the circumferential direction.

Respective heating conductor portions 31A according to this embodiment are all inclined in the axial direction and the circumferential direction, and they are constituted along the upper and lower inner peripheral surfaces of the workpiece Q4.

As shown in FIG. 10, the heating conductor portion 31A of a first heating device 10A forms a zigzag shape in which bent portions 134 and 135 are alternately continuously arranged in opposed directions along the circumferential direction R and each bent conductor portion 136 is arranged between the bent portions 134 and 135 facing each other. Each of the bent portions 134 forms a bent shape opened toward the outer side which is one side of a direction crossing the moving direction, and the bent portion 135 forms a bent share opened toward the radially inner side which is the other side of the same. Each of the conductor portions 136 is extended to cross the circumferential direction R, constituted in such a manner that a circumferential length of a portion apart from the axis C1 which is the center of rotation becomes longer than a circumferential length of a portion close to the axis C1, and formed in such a manner that the length in the circumferential direction is associated with a speed in the circumferential direction. Since the conductor portion 136 is bent in such a manner that an extension angle of the part apart from the axis C1 with respect to the circumferential direction R is smaller than an extension angle of the part close to the axis C1 while maintaining a cross-sectional area and a cross-sectional shape orthogonal to an extending direction constant, the speed and the length in the circumferential direction can be associated with each other.

This embodiment can obtain the same effect as the first embodiment.

Fifth Embodiment

An induction hardening apparatus 4 according to a fifth embodiment of the present invention will now be described with reference to FIG. 14. It is to be noted that structures are equal to those in the first embodiment except that a shape of a workpiece Q5 is different and a treatment target portion A is inclined, thereby omitting a repeated explanation.

Figure 14:
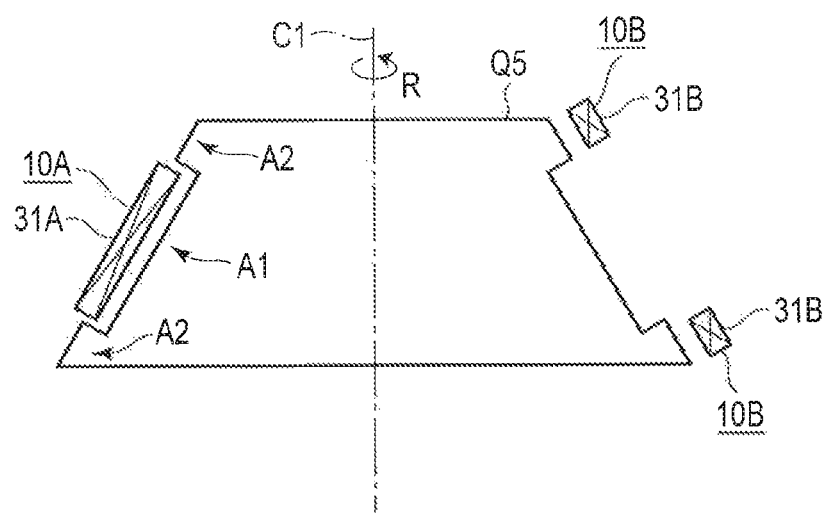
FIG. 14 is an explanatory view showing an induction hardening apparatus according to a fifth embodiment of the present invention.

FIG. 14 is a side view showing an arrangement of the induction hardening apparatus 4 according to this embodiment.

In this embodiment, as shown in FIG. 14, a peripheral surface of the workpiece Q5 having a stepped trapezoidal cross section is determined as a treatment target portion A. An outer peripheral surface of a central part in the axial direction is determined as a first region A1, and an outer peripheral surface of each step portion protruding toward the outer side at each of both ends in the axial direction is determined as a second region A1.

The induction hardening apparatus 4 comprises a first heating apparatus 10A that inductively heats the first treatment target portion A1 at the central part in the axial direction and second heating devices 10B that inductively heats the second treatment target portions A2 provided at two positions at both the ends in the axial direction. Each of the regions A1 and A2 forms a surface inclined with respect to the axis, and a distance from the center of rotational movement is changed. Heating conductor portions 31A and 31B according to this embodiment are all inclined with respect to the axial direction and the circumferential direction, and they are constituted in parallel to the upper and lower outer peripheral surfaces of the workpiece Q5. As a shape of the heating conductor portion 31A, for example, the same heating conductor portion 31A as that in the third embodiment is used. That is, the heating conductor portion is inclined in the axial direction and has a zigzag shape with bent portions 134 and 135 facing each other, and a conductor portion 136 is bent in such a manner that an extension angle of a part apart from the axis C1 with respect to the circumferential direction R is smaller than an an extension angle of a part close to the axis C1 while maintaining a cross-sectional area and a cross-sectional shape orthogonal to an extending direction constant.

This embodiment can obtain the same effects as as those in the first to fourth embodiments.

Although the flexure portions are exemplified by the bent portions 34 and 35 each of which is bent into a rectangular shape having a U-like cross section in the foregoing embodiment, the present invention is not restricted thereto.

Sixth Embodiment

Figure 15:
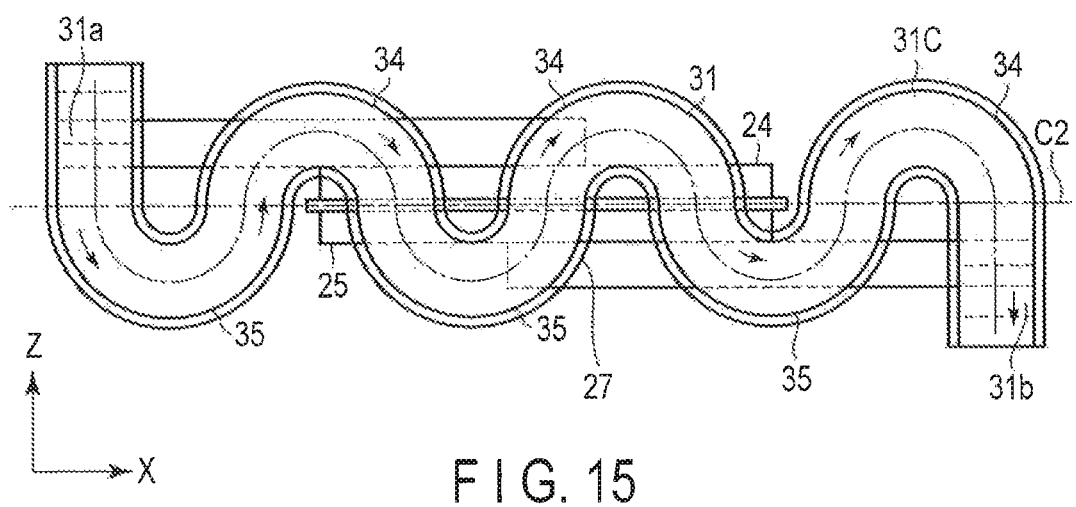
FIG. 15 is an explanatory view of a heating coil incorporated in an induction hardening apparatus according to a sixth embodiment of the present invention.

In FIG. 15, a first heating conductor portion 31C configured to have curved portions (the flexure portions) 34 and 35 each having a shape curved into a semicircular shape may be applied as a sixth embodiment of the present invention. This embodiment can likewise obtain the same effects as those in the first to fifth embodiments.

Seventh Embodiment

In FIG. 16, a first heating conductor portion 31D configured to have bent portions 34 and 35 bent into a trapezoidal shape may be applied as a seventh embodiment of the present invention. This embodiment can likewise obtain the same effects as those in the first to fifth embodiments.

Moreover, a zigzag shape like the first embodiment may be adopted in place of such a bent shape. Although the example where the relative movement is carried out by rotating the workpiece Q1 has been explained in the foregoing embodiment, the present invention is not restricted thereto, and the relative movement may be effected by moving the heating conductor portions 31A and 31B.

Eighth Embodiment

Although the example where each of the first heating device 10A and the second heating device 10B is arranged at four positions has been described in the first to fifth embodiments, the present invention is not restricted thereto.

FIG. 17 schematically shows a positional relationship when two first heating devices 10A and two second heating devices 10B are arranged as an eighth embodiment of the present invention. This embodiment can likewise obtain the same effects as those in the first to fifth embodiments.

Ninth Embodiment

FIG. 18 schematically shown a positional relationship when three first heating devices 10A and three second heating devices 10B are arranged as a ninth embodiment of the present invention. This embodiment can likewise obtain the same effects as those in the first to fifth embodiments.

10th Embodiment

Figure 19:
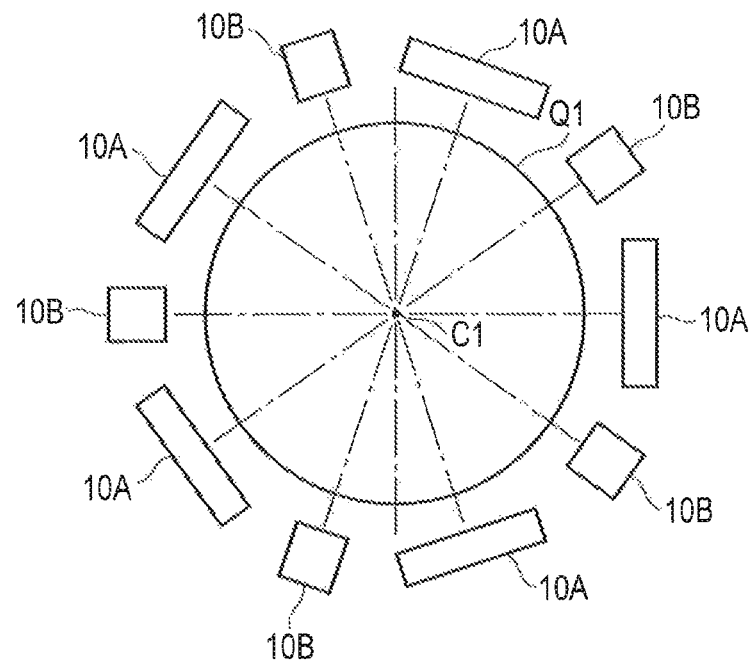
FIG. 19 is an explanatory view showing an induction hardening apparatus according to a 10th embodiment of the present invention.

FIG. 19 schematically shows a positional relationship when five first heating devices 10A and five second heating devices 10B are arranged as a 10th embodiment of the present invention. This embodiment can likewise obtain the same effects as those in the first to fifth embodiments.

11th Embodiment

Figure 20:
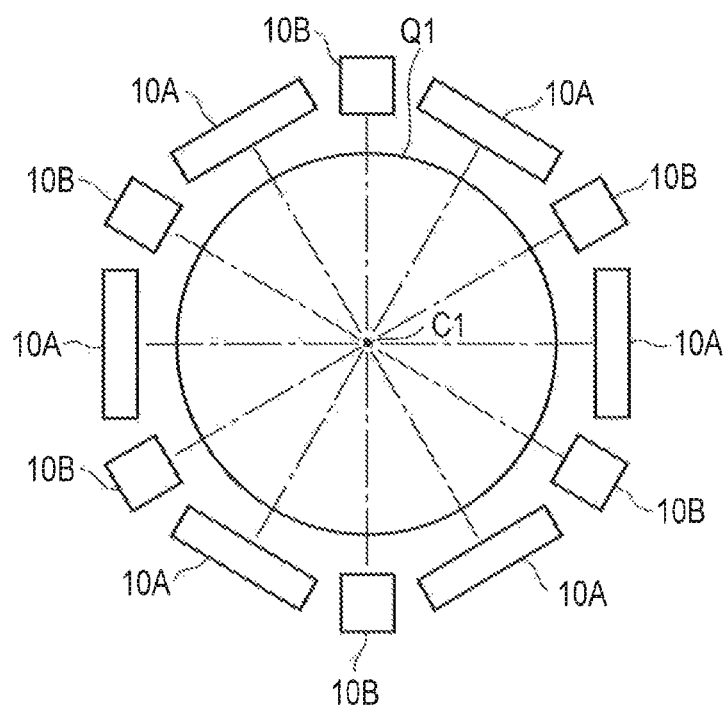
FIG. 20 is an explanatory view showing an induction hardening apparatus according to an 11th embodiment of the present invention.

FIG. 20 schematically shows a positional relationship when six first heating devices 10A and six second heating devices 10B are arranged as an 11th embodiment of the present invention. This embodiment can likewise obtain the same effects as those in the first to fifth embodiments.

12th Embodiment

Although the coil arrangement has been exemplified by the alternate arrangement or the opposed arrangement, the present invention is not restricted thereto, and an arbitrary arrangement such as 1:3 can be adopted. Although the workpiece Q1 having one step has been described as the example in the foregoing embodiment, the present invention is not restricted thereto, and the present invention can be likewise applied to a cage in which a workpiece having two or more steps is a target.

Figure 21:
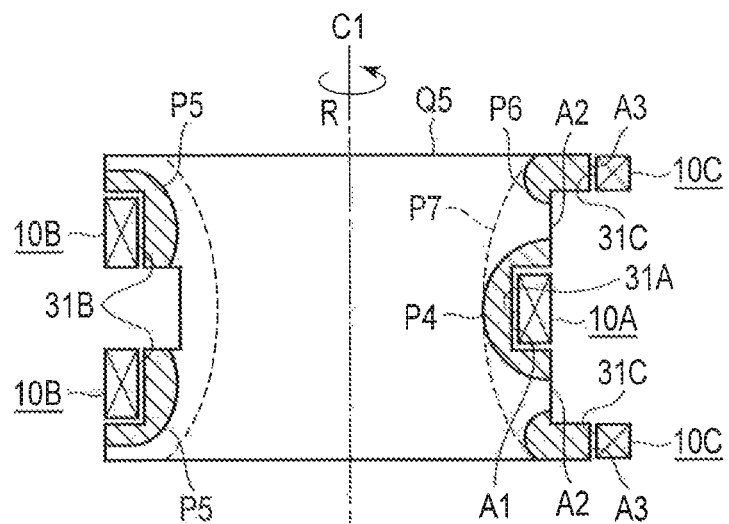
FIG. 21 is an explanatory view showing an induction hardening apparatus according to a 12th embodiment of the present invention.

In FIG. 21, as a 12th embodiment according to the present invention, when a workpiece Q5 having two steps is a target, three regions, i.e., first to third regions A1, A2, and A3 are set in a treatment target portion A which is an outer peripheral surface of the workpiece in accordance with positions of the steps. It is to be noted that the workpiece Q5 is symmetrical in the vertical direction and has the upper and lower steps in this example, and hence each of the second region A2 and the third region A3 is provided at two positions in the axial direction. Here, three induction hardening devices, 10A, 10B, and 10C are used and heating conductor portions 31A, 31B, and 31C are arranged to face the regions A1, A2, and A3, respectively. In this case, like the foregoing embodiments, when a first heating region P4 heated by the heating conductor portion 31A, a second heating region P5 heated by the heating conductor portion 31B, and a third heating region P6 heated by the heating conductor portion 31C are combined, one desired continuous heating region P7 can be easily treated.

Further, the workpiece is not restricted to the hollow type, and it may be a solid type.

13th Embodiment

An induction hardening apparatus 201 (a heat treatment apparatus) according to a 13th embodiment of the present invention will now be described with reference to FIG. 22 to FIG. 26.

Figure 22:
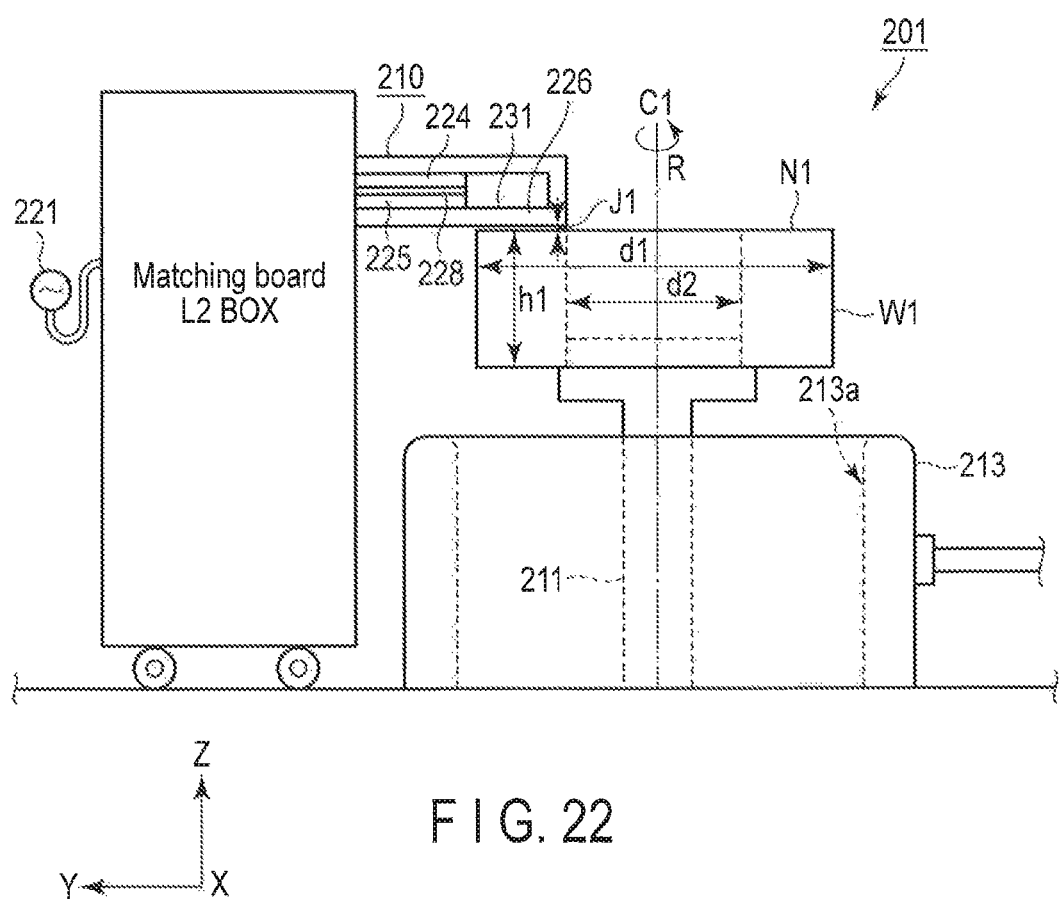
FIG. 22 is an explanatory view showing an induction hardening apparatus according to a 13th embodiment of the present invention.

FIG. 22 is an explanatory view schematically showing an entire configuration of the induction hardening apparatus 201 according to this embodiment. As shown in FIG. 22, the induction hardening apparatus 201 is an apparatus that performs high-frequency hardening, and it comprises a movement support unit (a workpiece moving and rotating support platform) 211 that movably supports a workpiece W1 as a treatment object, an induction heating device 210 (a heat treatment device) the inductively heats a treatment target portion N1 of the workpiece W1, and a cooling unit 213 (cooling unit) for cooling the workpiece W1 after a heat treatment step for the treatment target portion N1. The induction heating device 210 has a built-in matching board connected to a high-frequency power supply 221. The movement support unit 211 rotates the workpiece W1 on an axis C1 in a rotation direction (a circumferential direction) in a state such that the workpiece W1 is set at a predetermined position. At this time, the movement support unit 211 performs control to maintain a gap dimension J1 between a heating conductor portion 231 and the workpiece W1 at a predetermined value. Further, after the end of a heat treatment performed over the whole circumference (the whole stroke) of the treatment target portion N1, the movement support unit 211 moves the workpiece 1 to the cooling unit 213. The cooling unit 213 cools the workpiece W1 after the end of the heat treatment.

As shown in FIG. 23 to FIG. 26, the induction heating apparatus 210 comprises the high-frequency power supply 221 as power supplying unit, lead wires 222 and 223 connected to the high-frequency power supply 221, a spacer 228 including a pair of conductive plates 224 and 225 connected to the lead wires 222 and 223, an induction heating coil 226 having both ends connected to the pair of conductive plates 224 and 225, and a core 227 (shown in FIG. 26 alone) arranged on a back side of the heating conductor portion 231 of the induction heating coil 226.

As shown in FIG. 22, the workpiece W1 as an example of the treatment object is a radially thick component having a thickness of 25 mm or above, and this example uses a cylindrical member having, e.g., an outside diameter d1=500 mm, an inside diameter d2=250 mm, and an axial length h1=100 mm with the axis C1 at the center.

In this embodiment, for example, an annular planar region of the workpiece W1 orthogonal to the axis C1, which is one end surface in the axial direction, is determined as a treatment target portion N1. The treatment target portion N1 has an endless loop-like shape that is continuous along she circumferential direction of the workplace W1. Here, description will be given as to a case in which, in a state that the heating conductor portion 231 is arranged to face a part of the treatment target portion N1, the workpiece W1 is rotated on the axis C1 by the movement support unit 211, whereby the treatment target portion N1 is relatively moved with respect to the heating conductor portion 31 along the circumferential direction R (a rotation direction) with the axis C1 at the canter and a heat treatment is performed with respect to the whole circumference of the treatment target portion N1.

Figure 23:
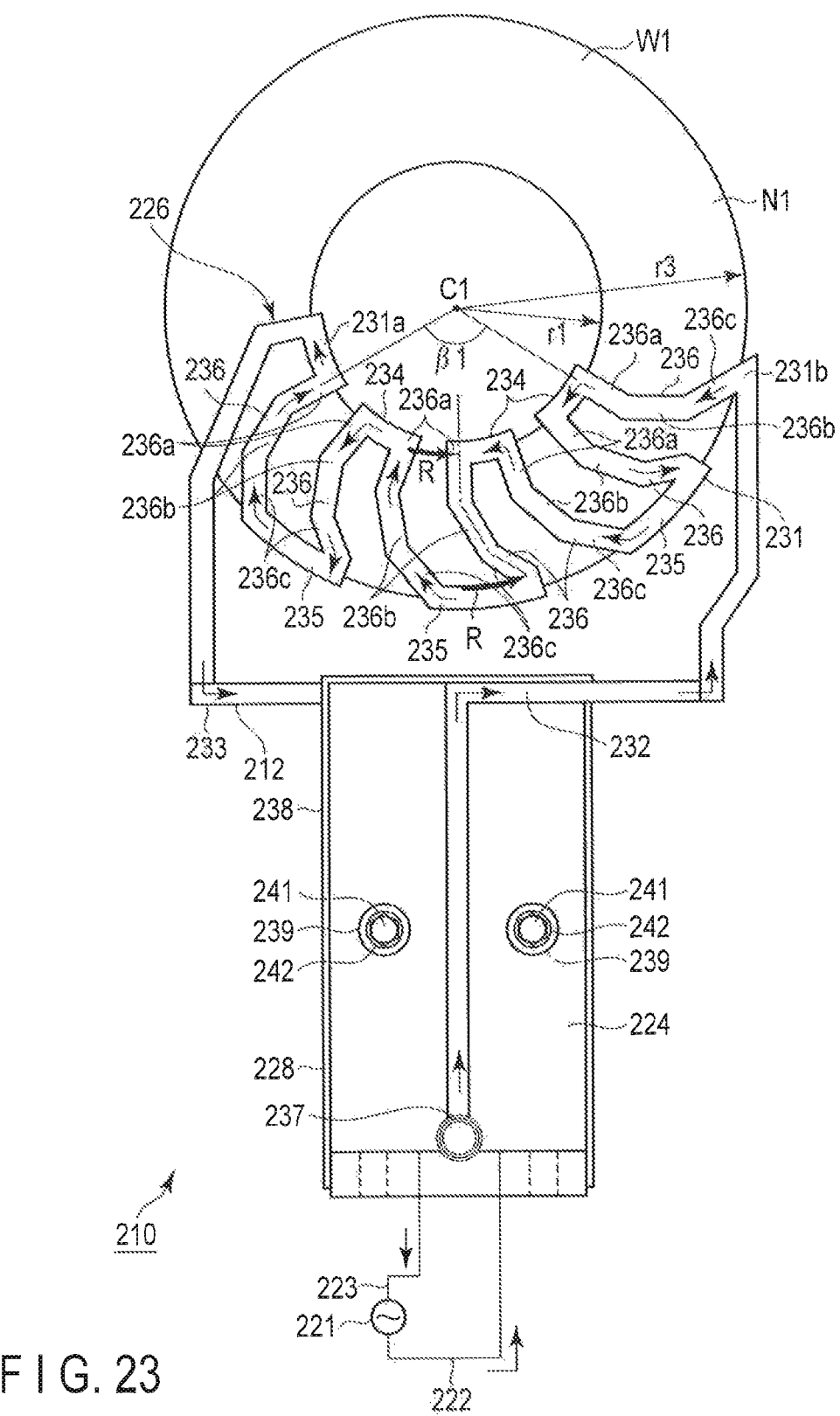
FIG. 23 is a plan view showing an induction heating apparatus according to the 13th embodiment.

As shown in FIG. 22 and FIG. 23, the induction heating coil 226 continuously and integrally comprises a zigzag-shaped heating conductor portion 231 that faces a part of the treatment target portion N1 of the workplace W1, a first connection conductor portion 232 that is continuous with one end side 231b of the heating conductor portion 231, and a second connection conductor portion 233 that is continuous with the other end side 231a of the heating conductor portion 231. The first connection conductor portion 232 is extended to be continuous with the end portion 231b on one end side of the heating conductor portion 231, and a coupler 237 configured to connect a component such as a hose for a coolant is provided at an end of this portion 232. The second connection conductor portion 233 is extended to be continuous with the end portion 231a on the other end side of the heating conductor portion 231, and a coupler 237 configured to connect a component such as a hose for a coolant is provide at an end portion of this portion 233.

The first connection conductor portion 232 and the second connection conductor portion 233 are arranged to sandwich a spacer 228. The spacer 228 has a configuration such that a pair of conductive plates 224 and 225 each having a rectangular tabular shape and a rectangular tabular insulating plate 238, which is sandwiched between the pair of conductive plates 224 and 225, are arranged in an overlapping manner and the conductive plates 224 and 225 and the insulating plate 238 are fixed by bolts 241 and nuts 242 through insulating bushes 239. The respective conductive plates 224 and 225 are connected to the high-frequency power supply 221 through the lead wires 222 and 223.

As shown in FIG. 23 to FIG. 25, the heating conductor portion 231 has a zigzag shape such that bent portions 234 and 235 are continuously alternately arranged in opposed directions along the circumferential direction R and each bent portion 236 is arranged between the bent portions 234 and 235 facing each other. Each of the bent portions 234 has a bent shape opened toward the outer side which is one side in a direction crossing the moving direction, and each bent portion 35 has a bent shape opened toward the radially inner side which is the other side.

A dimension in the circumferential direction R of the heating conductor portion 231 in which the bent portions 234 and 235 and the conductor portions 236 coupling these portions are configured is set to a cover ratio of 1/3, which is a ratio of the dimension in the circumferential direction R of the heating conductor portion 231 to the whole circumference of the treatment target portion N1, and also set to a central angle β1=120 degrees, for example.

Each of the conductor portions 236 is extended to cross the circumferential direction R, configured in such a manner that a circumferential length of a part apart from the axis C1 which is the center of rotation is longer than a circumferential length of a part close to the same, and formed in such a manner that a length in the circumferential direction can be associated with a speed in the circumferential direction. Since the conductor portion 236 is bent in such a manner that an extension angle of the part apart from the axis C1 with respect to the circumferential direction R is smaller than an extension angle of the part close to the axis C1 while maintaining a cross-sectional area and a cross-sectional shape orthogonal to an extending direction constant, the speed and the length in the circumferential direction can be associated with each other.

In this embodiment, as shown in FIG. 25, each of the conductor portions 236 is sectioned into three parts in the radial direction, and a center line C2 of the conductor portion 236 is bent at en angle of $\alpha1=\alpha2=150$ degrees at respective boundaries between the parts adjacent to each other. This center line is parallel to the extending direction of each part. A first part 236a on the inner side in the radial direction forms an angle of $\theta1=90$ degrees with respect to the circumferential direction R, an intermediate second part 236b is inclined to form an angle of $\theta2=60$ degrees with respect to the circumferential direction R, and the outermost third part 236c is inclined to form an angle of $\theta3=30$ degrees with respect to the circumferential direction R. That is $\theta1>\theta2>\theta3$ is achieved.

For example, here, dimensions are set based on two positions, i.e., the innermost point P1 and the outermost point P3 of the workpiece. It is assumed that a radius of rotation (a distance from the center of axis C1) of the reference point P1 on the treatment target portion N1 facing the first part 236a is r1=250 mm, a radius of rotation (a distance from the center of axis C1) of the reference point P3 on the treatment target portion N1 facing the third part 236c is r3=500 mm, a circumferential dimension of the first part 236a facing P1 is M1=15 mm, and a circumferential dimension of the third part 236c facing P3 is M3=30 mm. That is, the conductor portion 236 is set to achieve M1:M3≈r1:r3, and the distance from the center of axis C1 as the center of rotation is associated with the circumferential dimension. Therefore, based on P1 and P3, the circumferential dimension (the distance) is inversely proportionate no a circumferential speed which is proportionate to the radius of rotation, and a time required for passage, i.e., a heating time is maintained constant. Further, a dimension M2 of the middle second part 236b is set to achieve M1<M2<M3 so that M2 becomes a dimension between M1 and M3.

That is the dimension of the heating conductor portion 231 in the moving direction is set to be larger on the outer peripheral side where a speed of the treatment target portion N1 cutting across and passing the heating conductor portion 231 is increased than on the inner side where the speed is reduced when the workplace W1 is rotated on the axis C1, thereby making a heat treatment time uniform.

Figure 26:
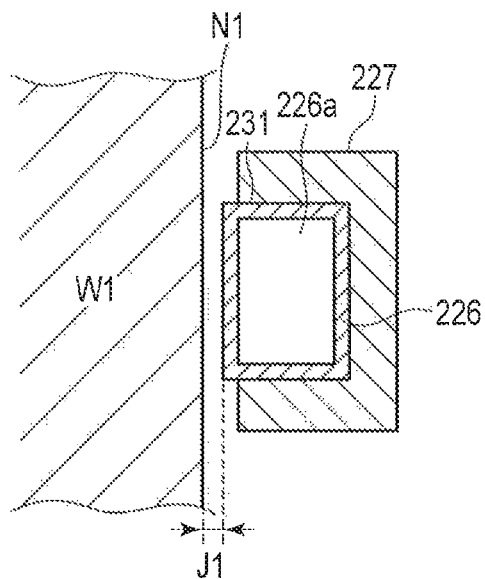
FIG. 26 is an explanatory view showing a cross sectional configuration of the heating coil according to the 13th embodiment.

As shown in a cross-sectional view of FIG. 26, the induction heating coil 226 is formed into a rectangular hollow shape from a material such as copper. This hollow portion 226a serves as a path through which the coolant circulates. The core 227 is made of a material having high permeability such as a silicon steel sheet, a polyiron core, or FERROTRON and arranged on the back side of the heating conductor portion 231. The core 227 is formed into a shape having a U-shaped cross section that integrally includes both side portions of the heating conductor portion 231 and a rear wall portion.

An induction hardening method (a heat treatment method) according to this embodiment will now be described. The induction hardening method according to this embodiment is constituted of a moving and heating step of performing relative movement while heating the treatment target portion N1 and a cooling step of cooling the treatment target portion N1 after the moving and heating step.

At the moving and heating step, as shown in FIG. 22 to FIG. 25, when the high-frequency power supply 221 is turned on in a state that the bee ring conductor portion 231 faces a part of the treatment target portion N1, a high-frequency current flows through the lead wire 222, the first conductive elate 224, the first connection conductor portion 232, the heating conductor portion 231, the second connection conductor portion 233, the second conductive plate 225, and the lead wire 223 in the mentioned order and returns to the high-frequency power supply 221.

In the heating conductor portion 231, as indicated by arrows in the drawing, the high-frequency current flows from the one end 231b side toward the other end 231a side through the bent portions 234, the conductor portions 236, and the bent portions 235, and an induction current is generated on a surface of the heating conductor portion 231 to inductively heat the oppositely arranged treatment target portion N1.

When the workplace W1 is rotated in a state that a gap dimension J1 between the surface of the treatment target portion N1 of the workplace W1 and the surface of the heating conductor portion 231 is maintained at a predetermined value by the movement support unit 211, the treatment target portion N1 is relatively moved with respect to the heating conductor portion 231 along the circumferential direction at a predetermined speed.

For example, here, the relative movement is effected at a speed of 200 to 300 mm/sec while maintaining a power of 100 to 150 kW and the gap dimension J1=2.5 mm. When the workplace W1 is rotated, it is possible to uniformly heat the entire region of the treatment target portion N1 which is the annular region on the end surface of the workpiece W1 arranged to face the heating conductor portion 231.

Here, considering the degree of the heat treatment at the reference points P1, P2, and P3 of the conductor portion 236, a time required to pass the opposed treatment target portion N1 is maintained constant even though the circumferential speed differs at each of the reference points P1, P2, and P3. Therefore, the degree of heating applied to the treatment target portion N1 can be made uniform.

Then, after the moving and heating step for the entire stroke in the circumferential direction R of the treatment target portion, the movement support unit 211 moves the workpiece W1 to the lower cooling unit 213 along the axial direction. The cooling unit 213 uses the coolant to cool the workplace N1 arranged in a space 213a that is a cooling region surrounded by a cooling jacket (a cooling step).

Further, when the coolant flows through the hollow portion 226a in the induction heating coil 226 via the first connection conductor portion 232, the heating conductor portion 231, and the second connection conductor portion 223, the induction heating coil 226 and the conductive plates 224 and 225 are cooled.

According to the induction heating coil, the induction heating apparatus, and the induction heating method according to this embodiment, the following effect can be obtained. That is, since the conductor portion 236 of the heating conductor portion 231 is changed in such a manner that the dimension in the circumferential direction can be associated with the distance from the axis C1, a time required for passage is maintained constant, and hence a heating time is made uniform. Therefore, a uniform treatment can be realized even though a movement speed of each part differs due to the rotation. Further, a heating temperature can be readily made uniform by the simple configuration, i.e., just bending at the angle associated with the circumferential speed with a fixed cross-sectional area without complicating heat treatment conditions.

Since the heating conductor portion 231 has a zigzag shape continuously having oppositely arranged bent portions, a ferromagnetic field can be assured, and an excellent temperature pattern can be obtained. Therefore, the high-speed and uniform heat treatment can be performed with less power. When the zigzag heating conductor portion 231 according to this embodiment is used, the heat treatment can be realized with a speed of 200 to 300 mm/sec and a heating time=300 s in a case of achieving an end-point temperature of 850 degrees on the surface of the treatment target portion N1 with the power of 100 kW. Therefore, when the workpiece has a large diameter of approximately 3.5 m, heating exceeding a transformation point A3 can be realized with a cover ratio of approximately 1/3.

When the induction heating coil 226 having the zigzag heating conductor portion 231 is used, the heat treatment for a large workpiece can be realized based on the scanning partial heating that cannot be realized by, e.g., a tabular induction heating coil. Further, since a treatment speed can be increased in this manner, the treatment can be carried out in accordance with a procedure of first effecting the heat treatment while moving the entire treatment target portion N1 and then performing cooling. Therefore, even the partial heating can realize the uniform heat treatment with no soft zone at a start end and a termination end of the treatment even though the treatment target portion N1 has a loop shape.

Since the heat treatment is performed while facing a part of the treatment target portion N1 and effecting the relative movement, a size of the heating conductor portion 231 can be decreased even though the treatment target portion N1 and the workpiece W1 are large, and the entire induction heating apparatus 210 can be reduced in size. Therefore, necessary power can be reduced, and a manufacturing cost can be suppressed.

Moreover, since the heat treatment is carried out while facing a part of the treatment target portion N1 alone and performing the relative movement, even if the workplace is deformed due to a factor such as thermal expansion, an appropriate gap dimension can be easily maintained. For example, when using an annular induction heating coil associated with a circular treatment target portion to perform the heat treatment based on a single shot heating process, since the workpiece is deformed due to thermal expansion, the induction heating coil must be set to be large in advance, and there occurs a problem of poor heating efficiency, but an appropriate gap can be maintained by just adjusting the arrangement with respect to the workpiece when the cover ratio is small like this embodiment.

14th Embodiment

An induction heating apparatus 210 according to a 14th embodiment of the present invention will now be described with reference to FIG. 27 to FIG. 30. It is to be noted that structures are equal to those in the 13th embodiment except that a treatment target portion N2 and a heating conductor portion 331 are inclined with respect to an axis C1, thereby omitting a repeated explanation.

Figure 27:
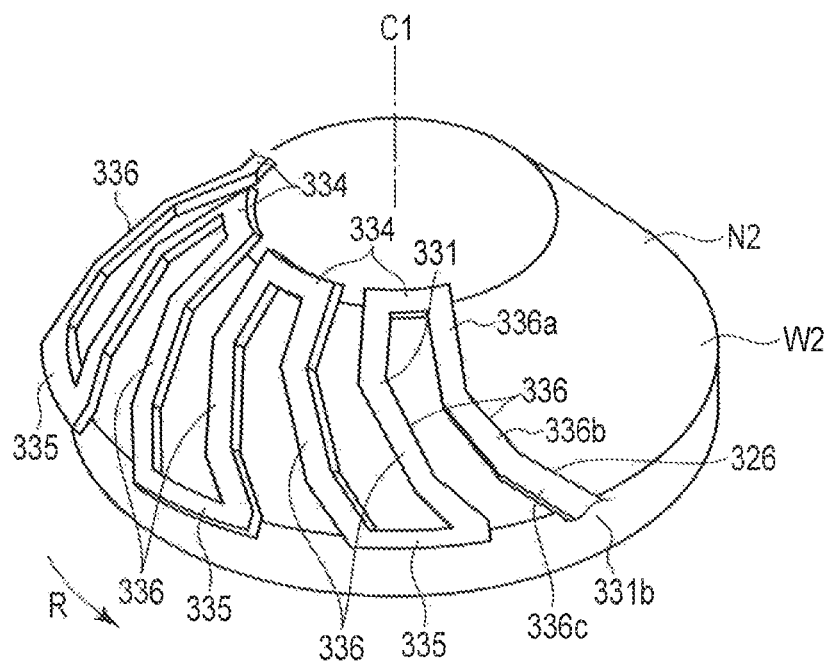
FIG. 27 is a perspective view showing a heating coil in an induction heating apparatus according to a 14th embodiment of the present invention.
Figure 28:
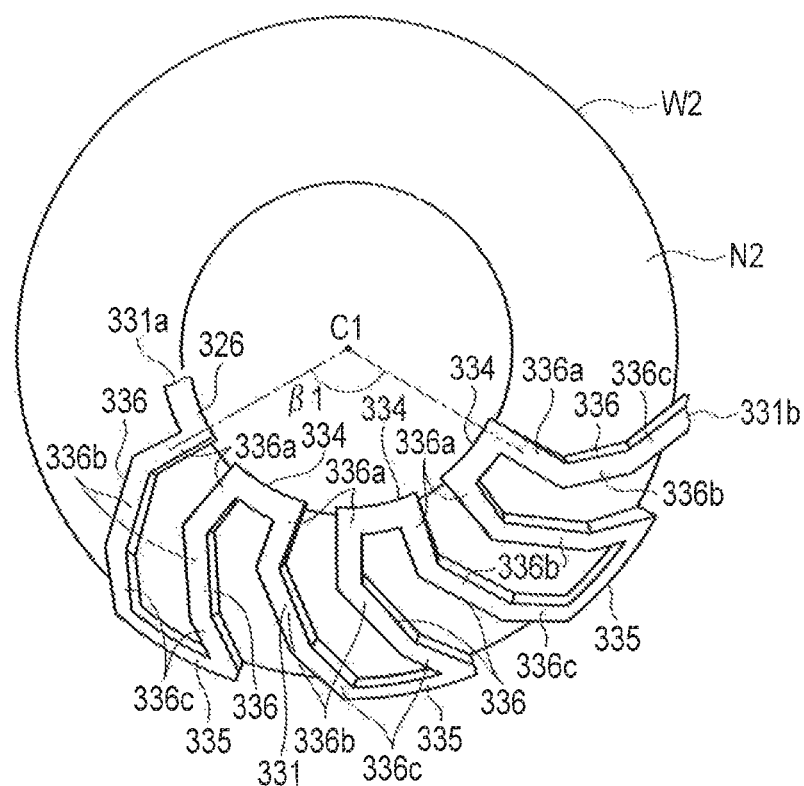
FIG. 28 is a plan view showing the heating coil.
Figure 29:
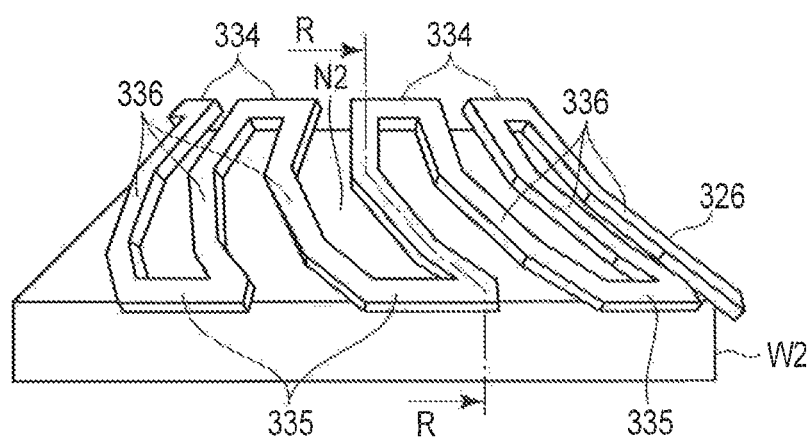
FIG. 29 is a side view showing the heating coil.

FIG. 27 is a perspective view showing configurations of a heating conductor portion 331 of the induction heating apparatus 210 and a workpiece W2 according to this embodiment, FIG. 28 is a plan view, FIG. 29 is a side view, and FIG. 30 is an explanatory view showing a part of the configurations.

In this embodiment, the workpiece W2 has a solid frustum-like shape, and the treatment target portion N2 which is a surface on one end side in an axial direction is inclined with respect to the axial direction and a radial direction. That is, the treatment target portion N1 is a planar surface orthogonal to the axis in the first embodiment, but the treatment target portion N2 forms an inclined surface that is inclined with respect to the axis in this 14th embodiment.

A basic configuration of a heating conductor portion 331 is the same as that of the heating conductor portion 231 according to the first embodiment, and bent portions 334 and 335 and conductor portions 336 that connect these bent portions are continuously configured. Each of the conductor portions 336 is extended to cross a circumferential direction R, configured in such a manner that a circumferential length of a part apart from an axis C1 which is the center of rotation is longer than a circumferential length of a part close to the axis C1, and formed in such a manner that a length in the circumferential direction can be associated with a speed in the circumferential direction. Since the conductor portion 336 is bent in such a manner that an extension angle of the part apart from the axis C1 with respect to the circumferential direction R is smaller than an extension angle of the part close to the axis C1 while maintaining a cross-sectional area constant, the speed and the length in the circumferential direction can be associated with each other.

For example, here, as shown in FIG. 30, bending angles of α3=α4=150 degrees, θ4=90 degrees, θ5=60 degrees, and θ6=30 degrees are set, and a relationship between a radius of rotation r1 of a reference point 34 on the treatment target portion N1 facing a first part 336a, a radius of rotation r3 of a reference point P6 facing a third part 336c, a circumferential dimension M4 of the first part 336a, and a circumferential dimension M6 of the third part 336c is set to r1:r3≈M4:M6. That is, the distance from the axis C1 and the circumferential dimension are changed to be associated with each other so that a movement speed and a dimension in a moving direction can be associated with each other.

This embodiment can obtain the same effect as that in the 13th embodiment.

For example, as the example of effecting the relative movement, the example of rotating the workpiece W1 to perform the relative movement has been described in the foregoing embodiment, but the present invention is not restricted thereto, and the relative movement may be performed by moving the heating conductor portion 231 side with a predetermined trajectory along the circumferential direction R.

15th Embodiment

Although the above has described the example where the heating conductor portion 231 or 331 is arranged at one position alone with respect to the one treatment target portion N1 or N2, the present invention is not restricted thereto, and induction heating apparatuses 210 may be arranged along a circumferential direction R at equal intervals.

FIG. 31 shows a 15th embodiment of the present invention. That is, when installing the two induction heating apparatuses 210, the two induction heating apparatuses 210 are arranged at positions with central angles of 180 degrees to face each other like the induction hardening apparatus 202. Further, in the case of three induction heating apparatuses, they are installed at positions with central angles of 120 degrees. When the plurality of induction heating apparatuses 210 are used, a cover ratio of one heating conductor portion can be reduced, and a treatment time can be decreased to quickly terminate the heat treatment, and hence this configuration is suitable when a workpiece has a large size in particular.

Although each of treatment target portions N1 and N2 is exemplified by a planar or inclined annular surface in the foregoing embodiments, the present invention is not restricted thereto, and the treatment target portion can be applied to a circular shape or any other shape having a concave portion or a step. Further, the solid frustum shape has been described as an example in the 14th embodiment, but a hollow frustum shape may be adopted.

Although the flexure portion formed by bending the end of the bending portion into a rectangular shape has been described as an example in the foregoing embodiment, the present invention is not restricted thereto, and it is possible to adopt a configuration having a curved portion having a shape curved into a semicircular shape.

Furthermore, although the example where the present invention is applied to one end surface in the axial direction alone has been described, it can be likewise applied to both end surfaces when forming each of both end surfaces in the axial direction into a circular plane or an inclined surface.

16th Embodiment

Although the conductor portion is sectioned into three parts in the radial direction in the foregoing embodiments, the present invention is not restricted thereto. It may be partitioned into two, four, or more parts.

Figure 32:
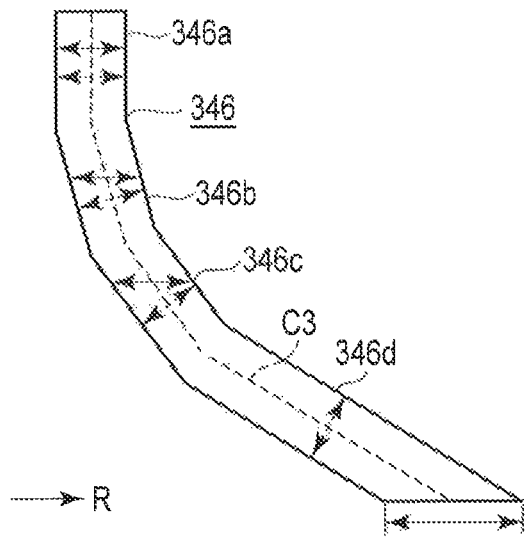
FIG. 32 is an explanatory view showing a configuration of a conductor portion according to a 16th embodiment of the present invention.

FIG. 32 shows a 16th embodiment according to the present invention. For example, like a conductor portion 346 shown in FIG. 32, four or more parts 346a, 346b, 346c, and 346d may be set and finely separated to associate a circumferential speed and a circumferential dimension with each other.

17th Embodiment

Figure 33:
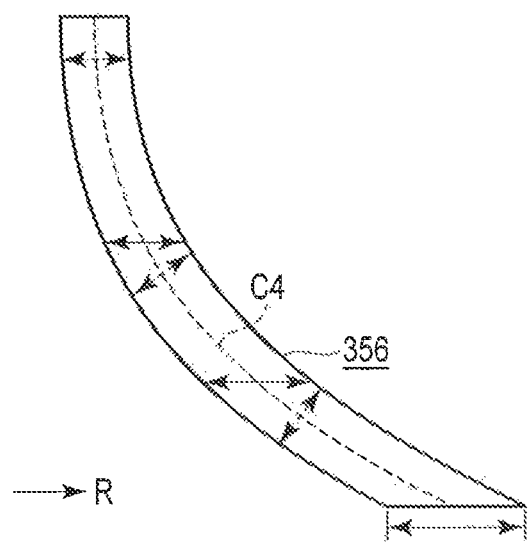
FIG. 33 is an explanatory view showing a configuration of a conductor portion according to a 17th embodiment of the present invention.

FIG. 33 shows a 17th embodiment according to the present invention. Like a conductor portion 356 depicted in FIG. 33, the conductor portion may be smoothly curved so that an angle gradually increases with decreasing distance to the outer side in the radial direction, thereby associating a circumferential speed and a circumferential dimension with each other. In each of the conductor portion 346 and the conductor portion 356, a dimension orthogonal to an extending direction C3 or C4 indicated by a dotted line in the drawing (dashed arrows) is fixed, and a dimension in a moving direction R (solid arrows) is changed to be associated with a speed in the moving direction P while keeping a uniform cross-sectional area. Moreover, the sectionalization in the radial direction may be equal division.

Additionally, as the example in which the distance from the center of rotation is associated with the circumferential dimension, the configuration in which the distance from the center of rotation is proportionate to the circumferential dimension has been described, but the present invention is not restricted thereto, and the present invention can be applied even though precise proportionality is not achieved.

18th Embodiment

Figure 35:
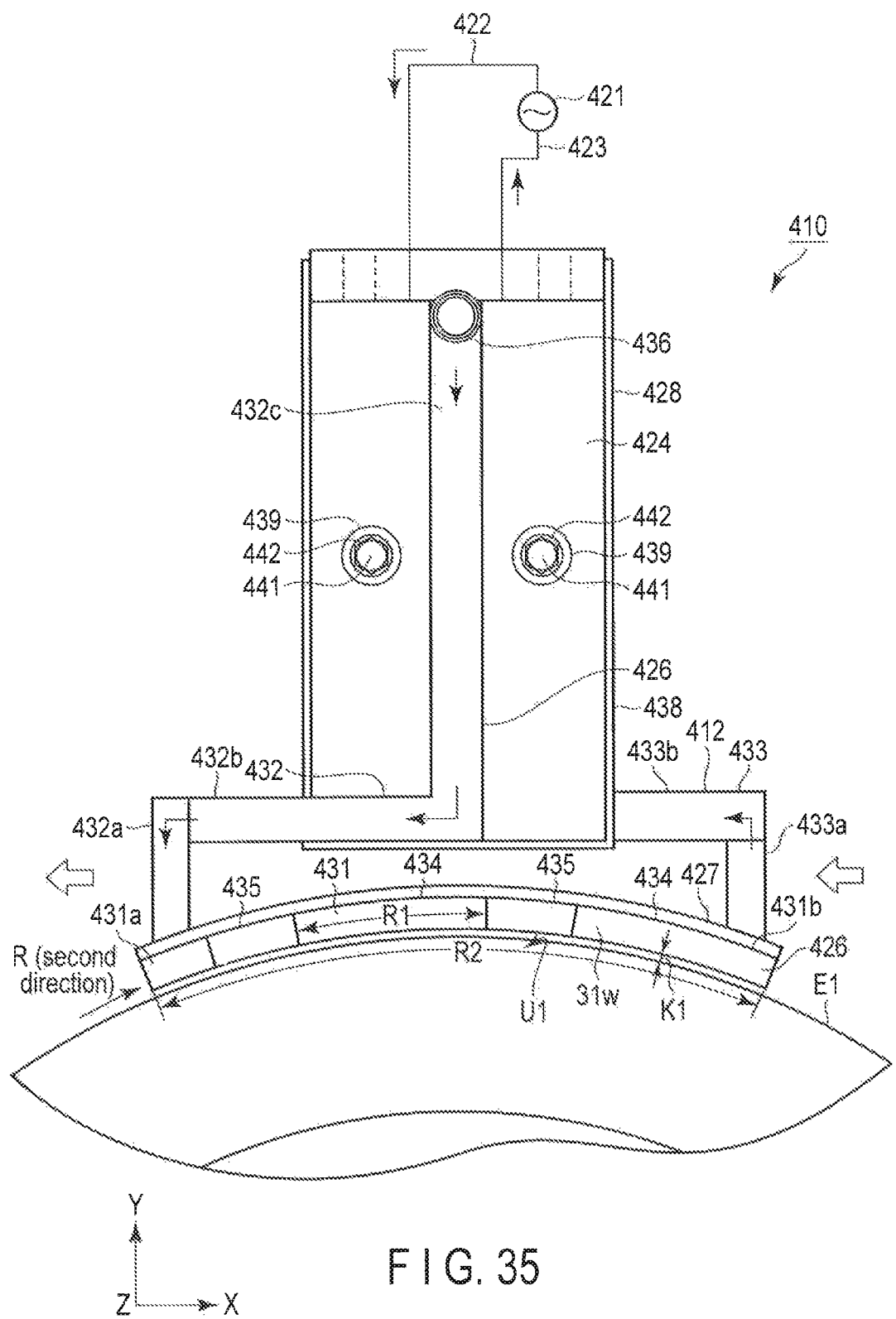
FIG. 35 is a plan view showing the heat treatment apparatus according to the 18th embodiment.
Figure 37:
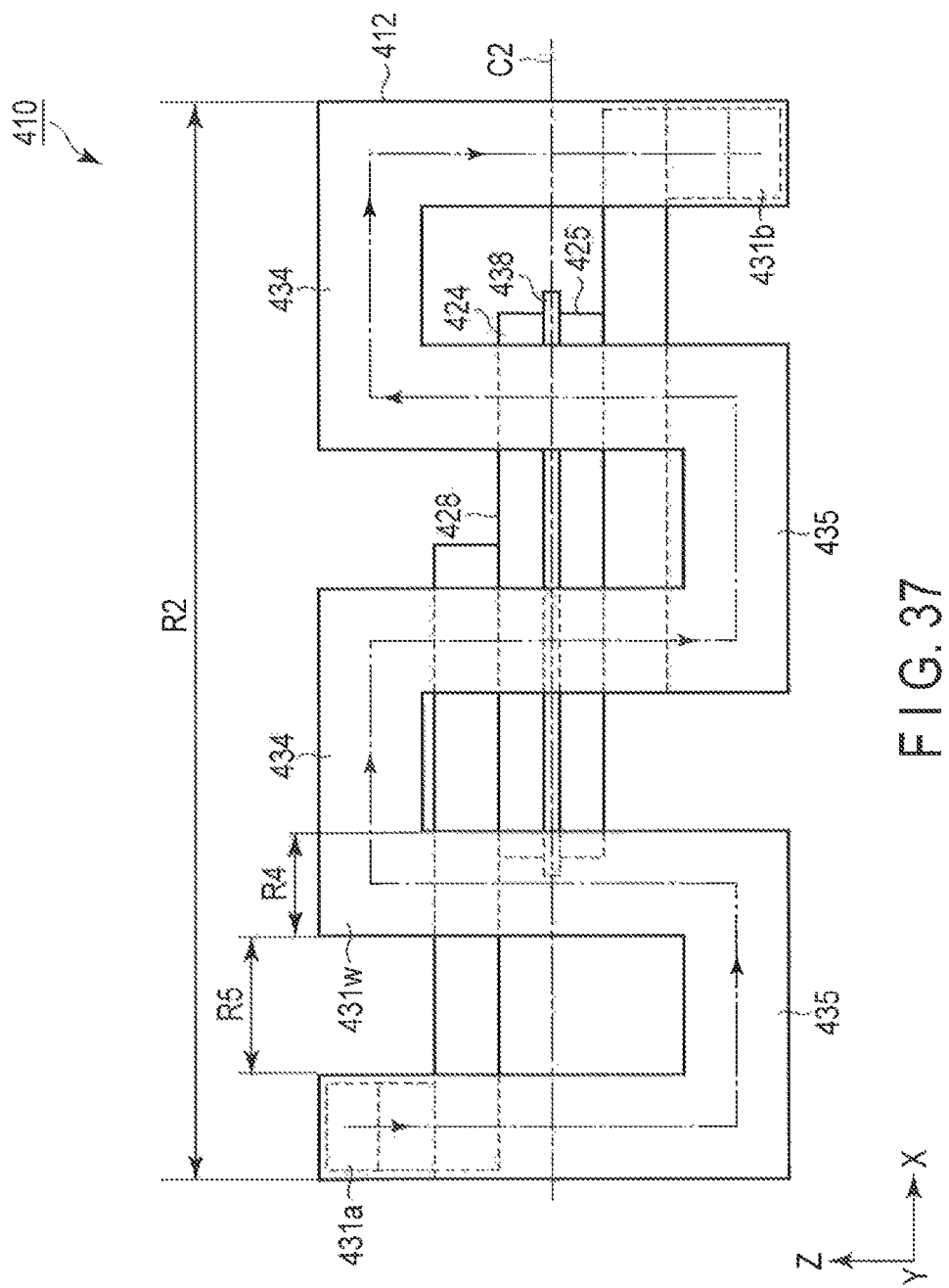
FIG. 37 is a front view showing the heat treatment apparatus according to the 18th embodiment.

FIG. 34 is an explanatory view schematically showing an entire configuration of a heat treatment apparatus according to this embodiment. FIG. 35 to FIG. 37 are respectively a plan view, a side view, and a front view of the heat treatment apparatus.

As shown in FIG. 34, a heat treatment apparatus 410 comprises a movement support unit 411 that movably supports a workpiece E1 as a treatment object, an induction heating portion 412 that inductively heats a treatment target portion U1 of the workpiece E1 while relatively moving with respect to the treatment target portion U1, and a cooling unit 413 (cooling unit) for cooling the workpiece 31 after a heat treatment step for the treatment target portion U1.

As shown in FIG. 35 to FIG. 38, the induction heating portion 412 comprises a high-frequency power supply 421 as power supplying unit, lead wires 422 and 423 connected to the high-frequency power supply 421, a spacer 428 including a pair of conductive plates 424 and 425 connected to the lead wires 422 and 423, an induction heating coil 425 having both ends connected to the pair of conductive plates 424 and 425, and a core 427 (shown in FIG. 35 and FIG. 38 alone) arranged on a back side of a heating conductor portion 431 of the induction heating coil 426.

The workpiece E1 as an example of the processing object shown in FIG. 34 is a radially thick component (a radially thick portion) having a thickness of 25 mm or above and, for example, there is used a cylindrical member having an outside radius r1=250 mm, an inside radius r2=200 mm, a all thickness dimension S1=50 mm, and an axial (first direction) length S1=100 mm with the center of axis C1 at the center. The heating conductor portion 431 is arranged to face a part of a treatment target unit U1 of the workpiece E1 while assuring a predetermined gap dimension N1.

In this embodiment, for example, description will be given as to a case in which a circular strip-like region at a central part in the axial direction on an outer peripheral surface of the workpiece E1 is determined as a treatment target unit U1 and a heat treatment is performed with respect to the whole circumference of this treatment target portion U1 as the radially thick portion. In this embodiment, a Z direction which is the axial direction of the workpiece E1 is the first direction, and a circumferential direction R parallel to the outer peripheral surface of the workpiece E1 with the center of axis C1 at the center is a second direction. Here, a radial dimension in the circumferential direction R is a value obtained by adding the gap dimension K1 to the radial dimension r1 of the outer peripheral surface of the workplace, and r1+K1 is obtained.

The treatment target portion U1 has an endless loop-like shape that is continuous along the circumferential direction on the outer peripheral surface of the workpiece E1. When the workplace E1 is rotated on the center of axis C1, the treatment target portion U1 and the heating conductor portion 431 are relatively moved along the circumferential direction R by the movement support unit 411.

As shown in FIG. 35 to FIG. 37, the induction heating coil 426 continuously and integrally comprises a zigzag heating conductor portion 431 facing the treatment target portion U1 of the workplace E1, a first connection conductor portion 432 that is continuous with one end side 431a of the heating conductor portion 431, and a second connection conductor portion 433 that is continuous with the other end side 431*b* of the heating conductor portion 431.

As shown in FIG. 37, the heating conductor portion 431 is formed of conductor members 431*w* and has a zigzag shape such that U-like bent portions 434 and 435 are opened toward the center C2 in the Z direction and alternately continuously arranged along the circumferential direction R so that these bent portions face each other. The bent portion 434 has a U-like shape opened toward the lower side, and the bent portion 435 has a U-like shape opened toward the upper side.

A total dimension R2 of the heating conductor portion 431 in the second direction is not lower than 1/10 and not creator than 1/2 of a dimension of a whole circumference in the second direction of the treatment target portion U1 facing the heating conductor portion 431. A cover ratio which is a ratio of the dimension of the heating conductor portion 431 in the second direction to the treatment target portion U1 is set to be approximately 1/10 here.

It is to be noted that R5 which is an interval of conductor members 431*w* adjacent to each other is set to be one times or above and two times or below a dimension of P4 which is a width of the conductor member 431*w*. This is because currents adjacent to each other have opposed directions to offset magnetic fluxes when the interval between the conductor members 431*w* adjacent to each other is equal to or less than the width dimension of the conductor member 431*w*, or the interval is too large to deteriorate heating efficiency when the interval is greater than two times. In this embodiment, the dimensions are set to R4=15 mm and R5=20 mm in FIG. 37.

The first connection conductor portion 432 continuously and integrally comprises a conductor portion 432*a* that extends from an end portion of the one end side 431*a* of the heating conductor portion 431 in the Y direction, a conductor portion 432*b* that bends from an end portion of the conductor portion 432*a* and extends toward the central side in the axial direction of the conductive plate 424 along the X direction, a conductor portion 432*c* that bends at the center of the conductive plate 424 and extends in the Y direction, and a conductor portion 432*d* that bends and extends in the Z direction. A coupler 436 configured to connect is component such as a hose for a coolant is provided at an end portion of the first connection conductor portion 432.

The second connection conductor portion 433 continuously and integrally comprises a conductor portion 433*a* that extends from an end portion of the other end side 431*b* of the heating conductor portion 431 in the Y direction, a conductor portion 433*b* that bends from an end portion of the conductor portion 433*a* and extends toward the central side in the axial direction of the conductive plate 425 along the X direction, a conductor portion 433*c* that bends at the center of the conductive plate 425 and extends in the Y direction, and a conductor portion 433*d* that bends and extends in the Z direction. A coupler 437 configured to connect a component such as a hose for a coolant is provided at an end portion of the second connection conductor portion 433.

The first connection conductor portion 432 and the second connection conductor portion 433 are arranged apart from each other in a thickness (Z axis) direction to sandwich a space 428 therebetween. The spacer 428 is constituted by overlapping the pair of conductive plates 424 and 425 each having a rectangular tabular shape and a rectangular tabular insulating plate 438 sandwiched between the pair of conductive plates 424 and 425 and fixing the conductive plates 424 and 425 and the insulating plate 428 through insulating bushes 439 by bolts 441 and nuts 442. The respective conductive plates 424 and 425 are connected to the high-frequency power supply 421 through the lead wires 422 and 423.

Figure 38:
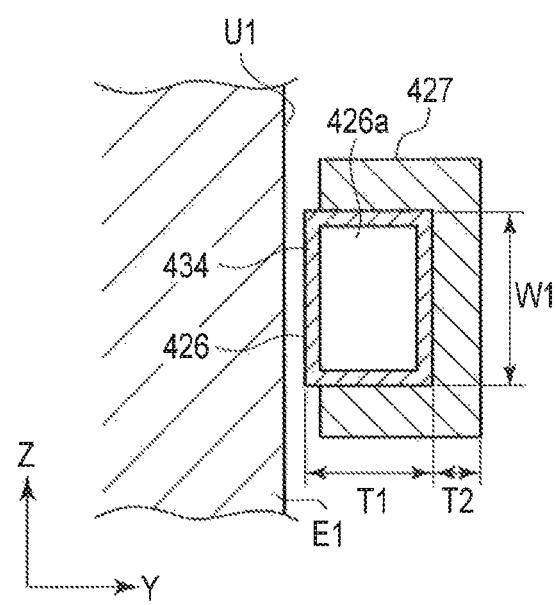
FIG. 38 is an explanatory view showing a cross-sectional configuration of a heating coil according to the 18th embodiment.
Figure 39:
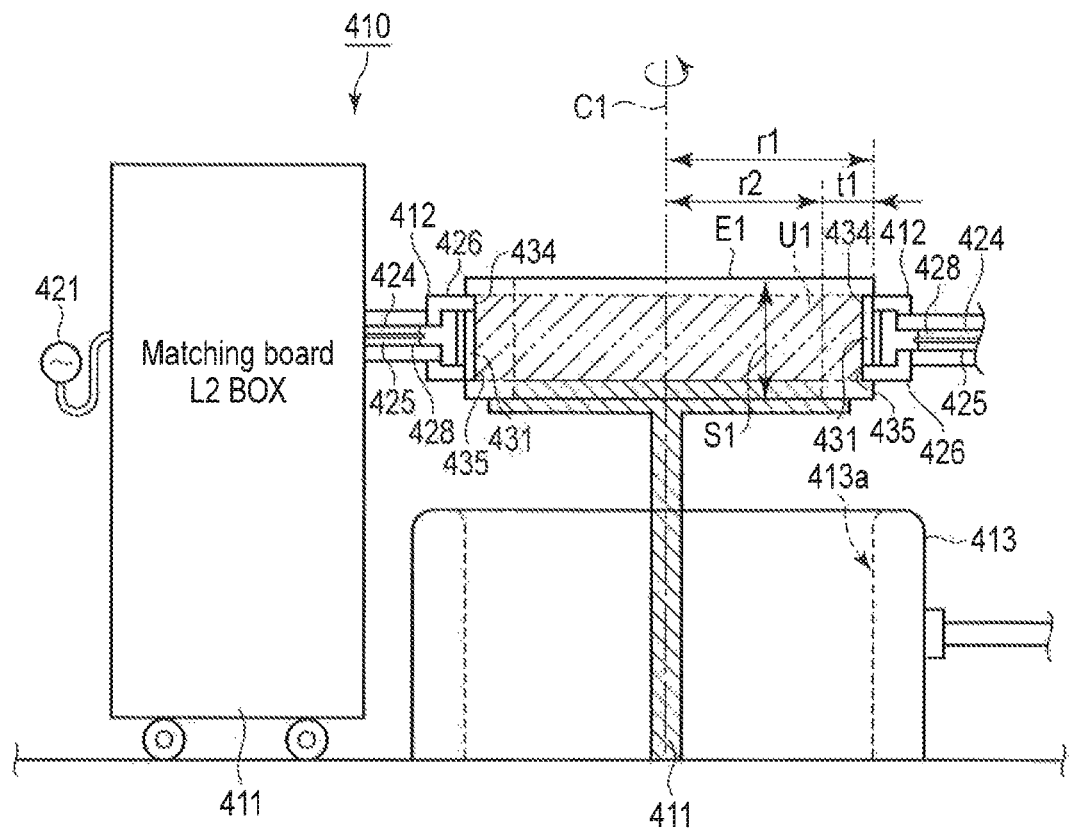
FIG. 39 is an explanatory view showing a heat treatment apparatus according to a 19th embodiment of the present invention.

As shown in a cross-sectional view of FIG. 38, the induction heating coil 426 is formed into, e.g., a rectangular hollow shape from a material such as copper. This hollow portion 426*a* serves as a path through which the coolant circulates. The induction heating coil 426 is set to have a width dimension W1=15 mm and a thickness dimension T1 in the Y direction=10 mm.

The core 427 is made of a material having high permeability such as a silicon steel sheet, a polyiron core, or FERROTRON and arranged on the back side of the heating conductor portion 431. The core 427 has a thickness T2=approximately 5 mm and is formed into a shape having a U-like cross section that integrally includes both side portions of the heating conductor portion 431 and a rear wall portion.

The movement support unit 411 depicted in FIG. 34 rotates the workplace E1 on the center of axis C1 in a state that the workpiece E1 is set at a predetermined position. At this time, the movement support unit 11 performs control so that the cap dimension E1, between the heating conductor portion 431 and the workpiece E1 can be maintained at a predetermined value. Further, after the end of the heat treatment over the whole circumference (the whole stroke) of the treatment target unit U1, the movement support portion 411 moves the workpiece E1 to the lower cooling unit 413 along the axial direction.

The cooling unit 413 provided below the heating coil 426 is constituted as a cylindrical shape to surround the outer side of the workpiece E1, which has been moved to the lower side after the heat treatment, and cools the workpiece E1 arranged in an inner space 413*a*.

A heat treatment method according to this embodiment will now be described. The heat treatment method according to this embodiment comprises a moving and heating step of relatively moving the treatment target portion U1 while heating the same and a cooling step of cooling the treatment target portion U1 after she moving and heating step.

At the moving and heating step, when the high-frequency power supply 421 is turned on in a state that the heating conductor portion 431 is arranged to face a part of the treatment target portion U1 as shown in FIG. 34 to FIG. 37, a high-frequency current flows through the lead wire 422, the first conductive plate 424, the first connection conductor portion 432, the heating conductor portion 431, the second connection conductor portion 433, the second conductive plate 425, and the lead wire 423 in the mentioned order and returns to the high-frequency power supply 421.

At this time, in the heating conductor portion 431, the high-frequency current flows from the one end 431*a* side to the other end 431*b* side as indicated by arrows in FIG. 35 to FIG. 37, and an induction current is generated on the surface of the heating conductor portion 431 to heat the oppositely arranged treatment target portion U1.

At this time, when the workpiece E1 is rotated in a state that the gap dimension K1 between the surface of the treatment target portion U1 of the workpiece E1 and the surface of the heating conductor portion 431 is maintained at the predetermined value, the heating conductor portion 431 relatively moves with respect to the treatment target portion U1 in the second direction at a predetermined speed.

For example, here, the relative movement is performed at a speed of 200 to 300 mm/sec while maintaining a power of 100 to 150 kW and the gap dimension K1=2.5 mm.

With the above-described operation, the entire region of the treatment target portion U1, which is a strip-like region on the outer peripheral surface of the workpiece E1 arranged to face the heating conductor portion 431, is uniformly heated.

After the end of the heat treatment over the whole circumference of the treatment target portion U1, the movement support unit 411 moves the workpiece 61 to the lower cooling unit 413 along the Z direction. The cooling unit 413 uses a coolant to cool the workpiece E1 arranged in the space 413a which is a cooling region surrounded by a cooling jacket.

Moreover, when the coolant flows through the hollow portion 426a in the induction heating coil 426 and the hollow portion 426a of the first connection conductor portion 432, the heating conductor portion 431 and the second connection conductor portion 433, the induction heating coil 426 and the conductive plates 124 and 425 are cooled.

According to the induction heating coil, the heat treatment apparatus, and the heat treatment method of this embodiment, the following effect can be obtained. That is, since the heating conductor portion 131 is formed into a zigzag shape continuously having the flexure portions, a ferromagnetic field can be assured, and an excellent temperature pattern can be obtained. Therefore, the high-speed and uniform heat treatment can be performed with low power.

For example, coil efficiency is approximately 30% when a hairpin-like coil is used whereas the coil efficiency of approximately 70% can be assured when the zigzag shape as in this embodiment is used.

Moreover, when the interval between the conductor members 431w adjacent to each other is set to be one times or above and two times or below the width dimension of the conductor member 431w of the heating conductor portion 431, the offset of magnetic fluxes can be avoided, and the self-loss of the coil can be reduced.

When the zigzag heating conductor portion 431 according to this embodiment is used, an end-point temperature of 850 degrees can be realized on the surface of the treatment target portion U1 with power of 100 kW by setting a speed of 200 to 300 mm/sec and a heating time=300 s. That is when the induction heating coil 426 having the zigzag heating conductor portion 431 is used, it is possible to realize the heat treatment for a large workpiece based on scanning partial heating that cannot be realized by, e.g., a tabular induction heating coil.

Additionally, it is possible to perform the uniform heat treatment with no soft zone at a start end and a termination end of the treatment when the treatment target portion U1 has a loop-like shape even though the partial heating is used.

Therefore, for example, when a roller bearing is a workpiece and a raceway surface on which a rolling element passes is the treatment target portion U1, a on hardened layer having no soft zone can be formed, and hence particularly excellent characteristics can be obtained.

Since the heat treatment is carried out while arranging the conductor portion to face a part of the treatment target portion U1 and performing the relative movement, when the treatment target portion U1 and the workpiece E1 are large, a size of the heating conductor portion 431 can be reduced by arranging the plurality of heating conductor portions 431, thereby miniaturizing the heat treatment apparatus 410. Therefore, the necessary power can be decreased, and a manufacturing cost can be suppressed.

Further, since the heat treatment is carried out while arranging the conductor portion to face a part of the treatment target portion U1 and performing the relative movement, for example, when a circular member having bent portions is a workpiece, an appropriate gap dimension can be easily maintained even though the workpiece is deformed due to a factor such as thermal expansion at the time of induction heating. For example, when using an annular induction heating coil associated with a circular treatment target portion to perform the heat treatment adopting a single shot heating process, since the workpiece is deformed due to thermal expansion, the induction heating coil must be set to have a larger sire in advance, heating efficiency is deteriorated, but an appropriate gap can be maintained by just adjusting the arrangement with respect to the workpiece when a cover ratio is small, as in this embodiment.

It is to be noted that a part in the workpiece having a thickness of 25 mm or above is determined as a radially thick component (a radially thick portion).

For example, although the description has been given as to the case that the relative movement is effected by rotating the workpiece E1 in the foregoing embodiment, the present invention is not restricted thereto, and the relative movement may be effected by moving the induction heating portion 412 side with a predetermined trajectory parallel to she second direction. Although the two bent portions 434 and the two bent portions 435 are arranged, the present invention is not restricted, and the number of the bent portions 434 or 435 may be one, three, or above, and the number of the bent portions 434 may be different from the number of the bent portions 435.

Although the description has been given as to the example where the one induction heating portion 12 is arranged at one position with respect to the one treatment target unit U1 in the foregoing embodiment, the present invention is not restricted thereto, and a plurality of induction heating portions 412 may be arranged along the second direction.

19th Embodiment

For example, in the case of installing two induction heating portions 412, two induction heating coils 426 are arranged at positions having central angles deviated by 180 degrees so that the coils face each other, and each central angle is set to 120 degrees when three induction heating coils are arranged.

20th Embodiment

Figure 40:
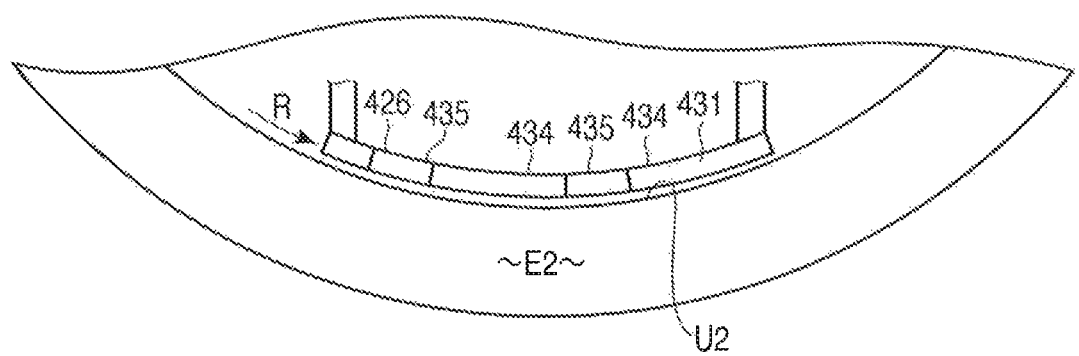
FIG. 40 is an explanatory view of a heat treatment apparatus according to a 20th embodiment of the present invention.

Although the heating conductor portion 431 is configured to curve so that its center protrudes beyond its both ends when seen in a plan view in the foregoing embodiment, the present invention is not restricted thereto, and the heating conductor portion 431 can be appropriately changed in accordance with a shape of a workplace. FIG. 40 shows a 20th embodiment according to the present invention. When an inner peripheral surface of a circular workpiece E2 is a treatment target portion U2, the heating conductor portion 431 is configured to curve in a direction opposite to the above direction so that both end portions protrude beyond a central side.

21st Embodiment

Figure 41:
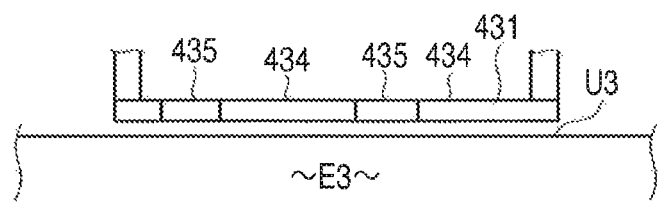
FIG. 41 is an explanatory view of a heat treatment apparatus according to a 21st embodiment of the present invention.
Figure 41:
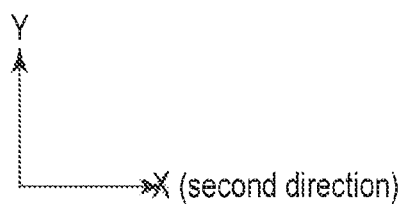

FIG. 41 shows a 21st embodiment according to the present invention. When a flat surface of a workplace E3 is a treatment target portion U3, a heating conductor portion 431 is configured to have a linear shape as seen in a plan view. It is to be noted that the linear X direction is a second direction. In such a case, the same effects as those of the foregoing embodiments can be likewise obtained.

22nd Embodiment

Figure 42:
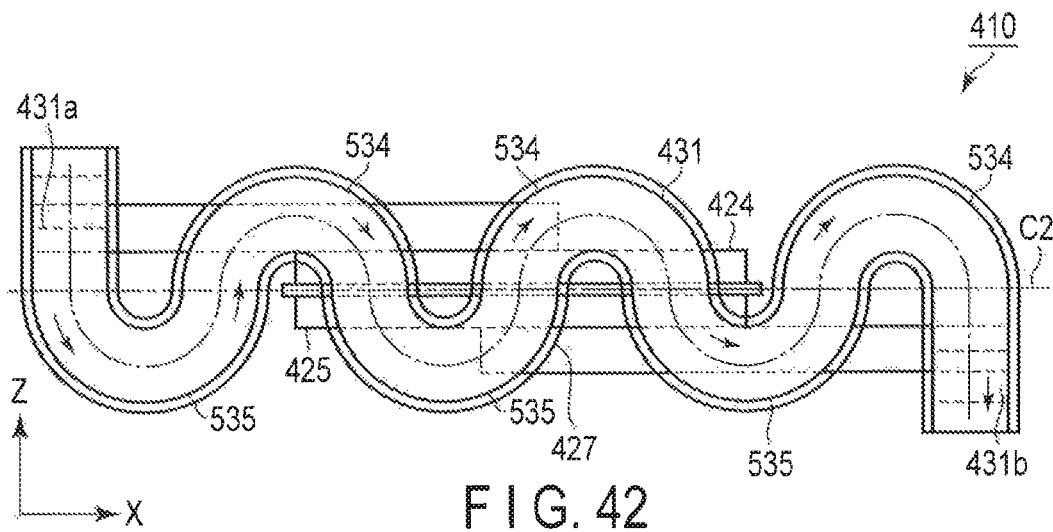
FIG. 42 is an explanatory view of a heat treatment apparatus according to a 22nd embodiment of the present invention.

FIG. 42 shows a 22nd embodiment according to the present invention. Although the bent portion 434 or 435 bent into the U-like rectangular shape has been described as an example of the flexure portion in the foregoing embodiment, the present invention is not restricted thereto. For example, as shown in FIG. 42, curved portions 534 and 535 curved into a semicircular shape may be formed. In this case, heating is carried out with a temperature pattern such that the heating is concentrated on the center C2 in the first direction. Therefore, this configuration is preferable when increasing a heating temperature on the center C2 side is desired.

Although the configuration in which the arc-like surface having a uniform thickness is the treatment target portion U1 has been described as the example in the foregoing embodiment, the present invention is not restricted thereto, and the surface of the treatment target portion may be inclined, or the treatment target portion may have a step portion, e.g., a concave portion.

Although the case that the work piece has the radius of approximately 250 mm and the cover ratio of approximately 1/10 has been described in the foregoing embodiment, the present invention is not restricted thereto. For example, the range of the cover ratio can be appropriately changed in accordance with conditions such as a diameter of a workpiece, and the cover ratio of 1/10 or above and 1/2 or below and 1/10 to 1/3 is preferable, for example. When the cover ratio is less than 1/10, sufficient heating cannot be performed. When the cover ratio exceeds 1/2, enabling the coil to follow expansion of the workpiece at the time or heating is difficult. Moreover, a facility cost is increased.

As another embodiment according to the present invention, for example, in regard to dimensions of the treatment target portion U1, when an outside diameter r1 of a workpiece=ϕ1000 mm and a height S1=110 mm are set, the heating conductor portions 431 are installed at two positions to face the treatment target portion U1, a total circumferential dimension of the heating conductor portions 431 at the two positions is set to 600 mm, and a cover ratio is set to approximately 1/5. In this case, heat treatment conditions are a power of 140 kW and a heating time=310 s, and an end-point temperature on the surface of the treatment target portion U1 is set to 900 degrees to realize the heat treatment.

Additionally, as still another embodiment according to the present invention, for example, in regard to dimensions of the treatment target portion U1, when an outside diameter r1 of a workpiece=ϕ3000 mm and a height S1=135 mm are set, the heating conductor portions 431 are installed at four positions to face the treatment target portion U1, a total circumferential dimension of the heating conductor portions 431 at the four positions is set to 2400 mm, and a cover ratio is set to approximately 1/4. In this case, heat treatment conditions are a power of 185 kW and a heating time=280 s, and an end-point temperature on the surface of the treatment target portion U1 is set to 920 degrees to realize the heat treatment.

23rd Embodiment

Figure 43:
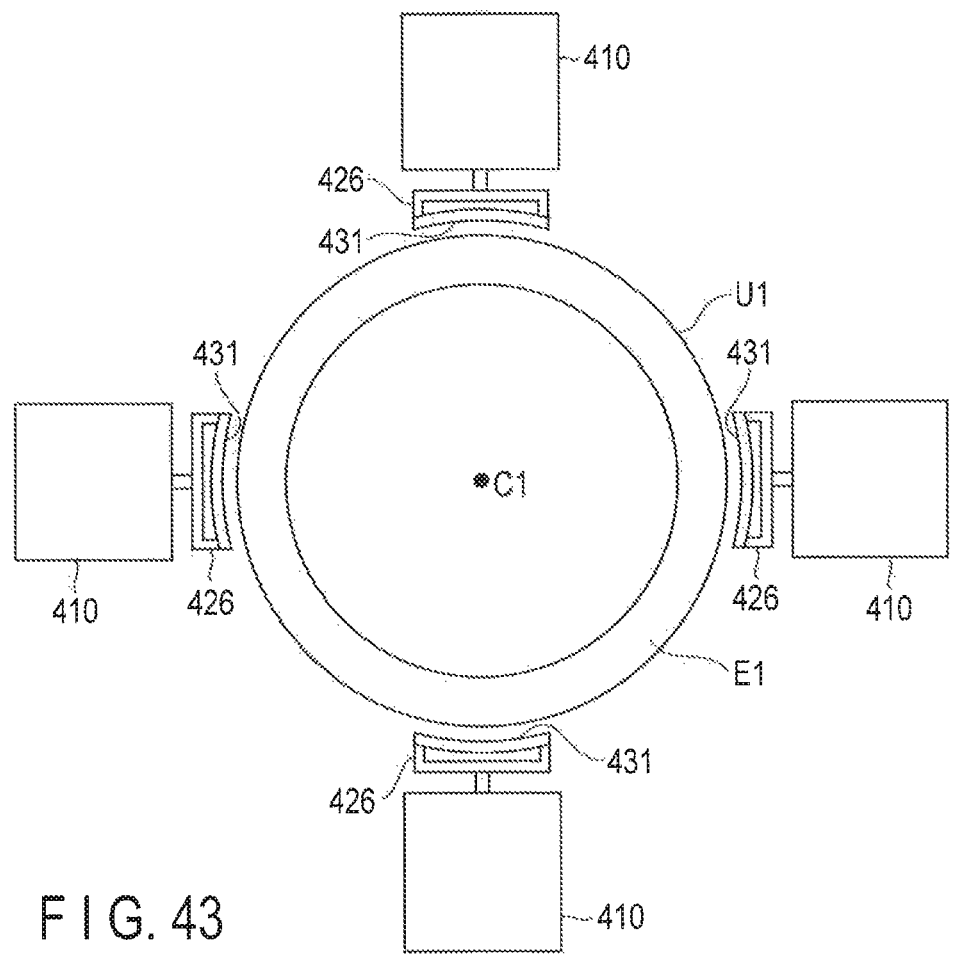
FIG. 43 is an explanatory view showing a heat treatment apparatus according to a 23rd embodiment of the present invention.

FIG. 43 is a plan view in which four induction heating coils 426 are arranged while shifting a central angle every 90 degrees as a 23rd embodiment according to the present invention. A cover ratio is set to 1/3 and four heating conductor portions 431 are arranged along a second direction. Here, a total cover ratio of the four heating conductor portions 431 arranged at equal intervals is set to 1/3. When the cover ratio is set in this manner, an induction heating apparatus can be minimized while maintaining a desired treatment time and treatment efficiency. Furthermore, when more than one induction heating portion 410 is used, the treatment time can be reduced, and the heating treatment can be rapidly completed, which is preferable when a size of a workpiece is large.

It is to be noted that the present invention is not restricted to the foregoing embodiments. For example, treatment conditions, or specific shapes, materials, dimensions, and other aspects of respective constituent elements such as a workpiece or a coil are not restricted to the examples described in the foregoing embodiments, and they can be appropriately changed. Moreover, some constituent elements may be eliminated from all the constituent elements described in the embodiments. Additionally, constituent elements in different embodiments may be combined. Further, it is needless to say that various modifications can be made without departing from the gist of the present invention.

According to the present invention, it is possible to provide the technology that can readily realize a heat treatment for a desired heated region, the technology that enables a uniform treatment, and the technology that can improve heat treatment efficiency even when a large treatment object is to be inductively heated.

The embodiments of the invention in which an exclusive property or privilege is claimed are defined as follows:

1. A method of inductively heat treating a treatment object, comprising:
   arranging a second heating conductor portion of a second heating coil at a second distance from a rotational axis to face a convex treatment region of the treatment object, the convex treatment region having an outermost surface with a second radius relative to the rotational axis, the second distance being greater than the second radius;
   arranging a first heating conductor portion of a first heating coil at a first distance from the rotational axis that is smaller than the second radius, to face a concave treatment region of the treatment object having a different position along the rotational axis than the convex treatment region and having an outermost surface with a first radius that is smaller than the second radius; and
   moving the treatment object relative to the first and second heating conductor portions along a circumferential direction of the treatment object while inductively heating the convex treatment region using the second heating conductor portion and inductively heating the concave treatment region using the first heating conductor portion, such that the convex treatment region and the concave treatment region form one continuous heating treatment region.

2. The method according to claim 1, further comprising moving the treatment object to a lower cooling unit after moving the treatment object relative to the first and second heating conductor portions along the circumferential direction by an entire stroke of the convex treatment region and the concave treatment region.

3. The method of claim 1, wherein at least one of the first or second heating coils have a zigzag shape in which a first bent portion with a first leg and a second leg opens toward a first side of the rotational axis, and a second bent portion with a third leg and a fourth leg opens toward a second side of the rotational axis, with the first leg, the second leg, the third leg, and the fourth leg being spaced away from the rotational axis by a common distance.

4. The method of claim 3, wherein the first heating conductor portion has the zigzag shape, and the second heating conductor portion has a hairpin shape.

5. The method of claim 1, wherein moving the treatment object relative to the first and second heating conductor portions comprises maintaining a second predetermined gap between the first heating conductor portion and an outer surface of the convex treatment region, and maintaining a first predetermined gap between the first heating conductor portion and an outer surface of the concave treatment region, to control for thermal expansion of the treatment object.

6. The method of claim 1, wherein the first heating conductor portion is one of a plurality of alike heating conductors of a plurality of alike heating coils, wherein arranging the first heating conductor portion of the first heating coil at the first distance from the rotational axis to face the concave treatment region of the treatment object comprises arranging the plurality of alike heating conductors at the first distance from the rotational axis to face the concave treatment region at different positions about the rotational axis, wherein the plurality of alike heating conductors cover between about 1/10 and about 1/2 of the outermost surface of the concave treatment region.

7. The method of claim 1, wherein a cover ratio of the second heating conductor portion relative to the outermost surface of the convex treatment region differs from a cover ratio of the first heating conductor portion relative to the outermost surface of the concave treatment region.

8. The method of claim 1, wherein at least one of the first heating conductor portion or the second heating conductor portion has an arc-like shape.

9. The method of claim 1, wherein at least one of the outermost surface of the convex treatment region or the outermost surface of the concave treatment region are inclined with respect to the rotational axis.

10. The method of claim 1, wherein the outermost surface of the convex treatment region and the outermost surface of the concave treatment region form a stepped outer treatment surface of the treatment object in an axial direction.

* * * * *